(12) United States Patent
Sawada

(10) Patent No.: US 12,499,506 B2
(45) Date of Patent: Dec. 16, 2025

(54) INFERENCE MODEL CONSTRUCTION METHOD, INFERENCE MODEL CONSTRUCTION DEVICE, RECORDING MEDIUM, CONFIGURATION DEVICE, AND CONFIGURATION METHOD

(71) Applicant: Live2D Inc., Tokyo (JP)

(72) Inventor: Keiichi Sawada, Tokyo (JP)

(73) Assignee: Live2D Inc., Tokyo (JP)

( * ) Notice: Subject to any disclaimer, the term of this patent is extended or adjusted under 35 U.S.C. 154(b) by 480 days.

(21) Appl. No.: 18/051,443

(22) Filed: Oct. 31, 2022

(65) Prior Publication Data

US 2023/0237611 A1 Jul. 27, 2023

Related U.S. Application Data

(63) Continuation of application No. PCT/JP2021/006206, filed on Feb. 18, 2021.

(51) Int. Cl.
*G06T 3/153* (2024.01)
*G06N 5/04* (2023.01)
*G06T 11/60* (2006.01)

(52) U.S. Cl.
CPC ............... *G06T 3/153* (2024.01); *G06N 5/04* (2013.01); *G06T 11/60* (2013.01)

(58) Field of Classification Search
CPC ..... G06T 3/153; G06T 11/60; G06T 2200/24; G06T 11/00; G06T 15/205; G06T 15/00; G06T 13/00; G06T 13/80; G06T 19/00; G06N 5/04
See application file for complete search history.

(56) References Cited

U.S. PATENT DOCUMENTS

| | | | | |
|---|---|---|---|---|
| 10,565,792 B2 * | 2/2020 | Bailey | ..................... | G06T 13/40 |
| 10,896,535 B2 * | 1/2021 | Li | ............................ | G06T 13/40 |
| 11,941,736 B2 * | 3/2024 | Huang | .................... | G06T 7/251 |
| 12,098,956 B2 * | 9/2024 | Harvill | .................... | G01J 3/524 |
| 2018/0300927 A1 | 10/2018 | Hushchyn et al. | | |

(Continued)

FOREIGN PATENT DOCUMENTS

| | | |
|---|---|---|
| CN | 108734652 A | 11/2018 |
| CN | 110288695 A | 9/2019 |

(Continued)

OTHER PUBLICATIONS

International Search Report for PCT/JP2021006206 (Apr. 27, 2021).

(Continued)

*Primary Examiner* — Henok Shiferaw
(74) *Attorney, Agent, or Firm* — Merchant & Gould P.C.

(57) ABSTRACT

An inference model construction method obtains a distribution of control points pertaining to a reference state and a distribution of the control points pertaining to a defined state with respect to a defined representation model. The method extracts a first feature value based on the distribution of the control points pertaining to the reference state. The method machine-learns the distribution of the control points pertaining to the defined state while using, as a label, the first feature value, and constructs an inference model based on a result of the leaning performed with respect to a plurality of the defined representation models.

15 Claims, 13 Drawing Sheets

(56) References Cited

U.S. PATENT DOCUMENTS

| | | |
|---|---|---|
| 2018/0300935 A1 | 10/2018 | Imai et al. |
| 2018/0372493 A1 | 12/2018 | Pilkington et al. |
| 2020/0151963 A1 | 5/2020 | Lee et al. |
| 2021/0019928 A1* | 1/2021 | Borer .................. G06N 3/04 |
| 2021/0256703 A1 | 8/2021 | Nakao et al. |
| 2021/0287430 A1* | 9/2021 | Li .......................... G06T 7/74 |
| 2022/0150414 A1* | 5/2022 | Almehmadi ........... G06V 10/62 |

FOREIGN PATENT DOCUMENTS

| | | | |
|---|---|---|---|
| EP | 3674983 A1 | | 7/2020 |
| JP | 2001-307123 A | | 11/2001 |
| JP | 2009104570 A | * | 5/2009 |
| JP | 2019-204476 A | | 11/2019 |
| JP | 2020-086511 A | | 6/2020 |
| JP | 2020-115336 A | | 7/2020 |
| WO | 2010/090259 A1 | | 8/2010 |
| WO | 2019/102692 A1 | | 5/2019 |
| WO | 2020/054503 A1 | | 3/2020 |
| WO | 2020/069049 A1 | | 4/2020 |

OTHER PUBLICATIONS

Decision to Grant for Japanese Patent Application No. 2022-531625 (Sep. 1, 2022).

Search Report for European Patent Application No. 21926567.5 (Nov. 7, 2023).

Office Action for Chinese Patent Application No. 202180031690.5, dated May 1, 2025, 16 pages including machine translation.

Notice of Allowance issued for Chinese Patent Application No. 202180031690.5, date of mailing: Aug. 28, 2025, 7 pages with English translation.

* cited by examiner

REFERENCE STATE

DEFINED STATE

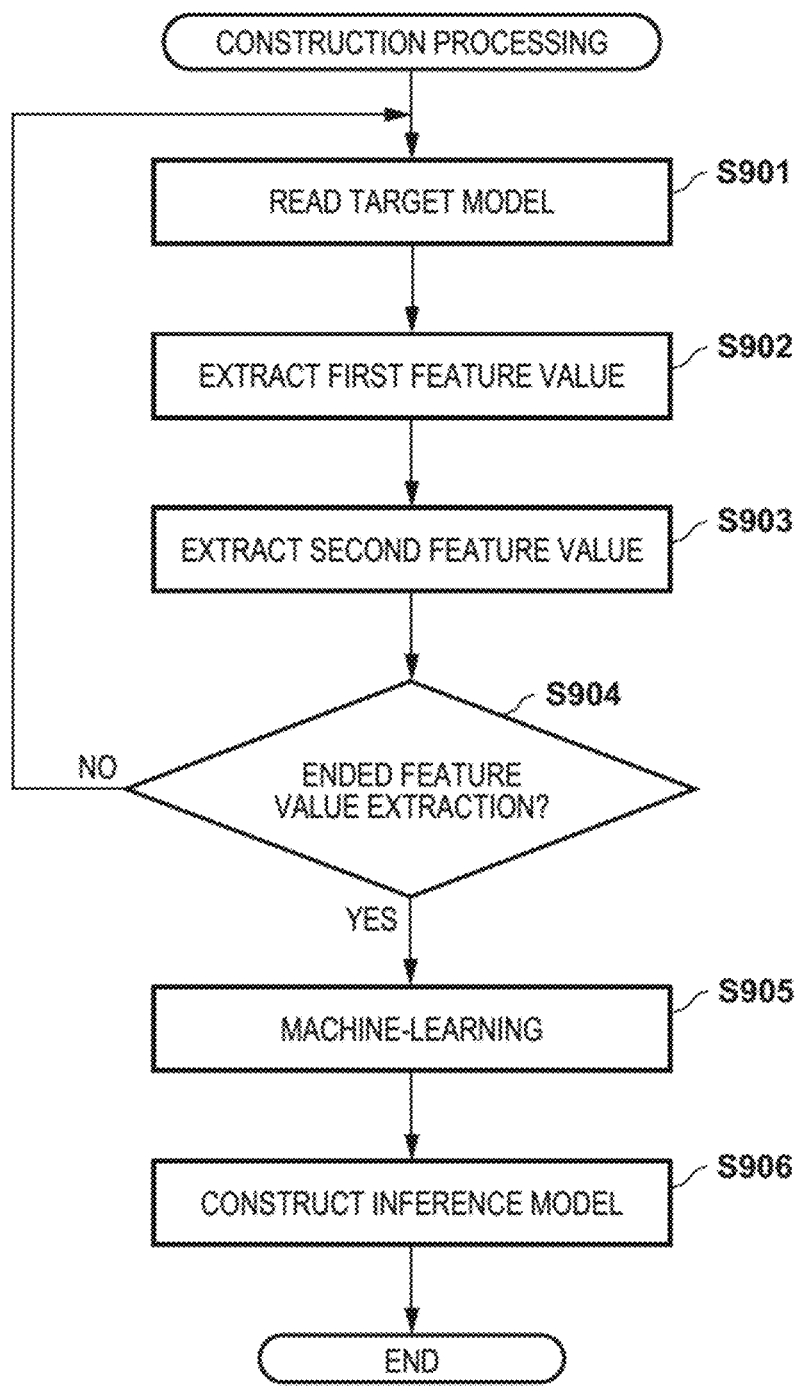

FIG. 10

DEFINED STATE A MOTION ADJUSTMENT

FACE
- TRANSLATIONAL LEVEL:10
- ROTATIONAL LEVEL:10

EYE
- TRANSLATIONAL LEVEL:10
- ROTATIONAL LEVEL:10

EYEBROW
☑ ALIGN TRANSLATION OF BROW TO TRANSLATION OF EYE
- TRANSLATIONAL LEVEL:10
- ROTATIONAL LEVEL:10

EAR
- TRANSLATIONAL LEVEL:10
- ROTATIONAL LEVEL:10

MOUTH
- TRANSLATIONAL LEVEL:10
- ROTATIONAL LEVEL:10

NOSE (LEFT)
- TRANSLATIONAL LEVEL:10
- ROTATIONAL LEVEL:10

NOSE (RIGHT)
- TRANSLATIONAL LEVEL:10
- ROTATIONAL LEVEL:10

F I G. 13A

| | |
|---|---|
| MODEL ID | ~1301 |
| TEXTURE INFORMATION | ~1302 |
| REFERENCE STATE INFORMATION | ~1303 |
| DEFINED STATE INFORMATION | ~1304 |

F I G. 13B

| | |
|---|---|
| PART ID | ~1311 |
| ROLE ID | ~1312 |
| TWO-DIMENSIONAL IMAGE | ~1313 |
| DETAILED INFORMATION | ~1314 |
| APPLICATION-TARGET CURVED SURFACE INFORMATION | ~1315 |

F I G. 13C

| | |
|---|---|
| PART ID | ~1321 |
| CONTROL POINT ID | ~1322 |
| PLACEMENT COORDINATES | ~1323 |
| CONTROL POINT ID | ~1322 |
| PLACEMENT COORDINATES | ~1323 |
| CONTROL POINT ID | ~1322 |
| PLACEMENT COORDINATES | ~1333 |

INFERENCE MODEL CONSTRUCTION METHOD, INFERENCE MODEL CONSTRUCTION DEVICE, RECORDING MEDIUM, CONFIGURATION DEVICE, AND CONFIGURATION METHOD

CROSS-REFERENCE TO RELATED APPLICATION(S)

This application is a continuation of International Patent Application No. PCT/JP2021/006206 filed on Feb. 18, 2021, the entire disclosures of which are incorporated herein by reference.

BACKGROUND OF THE INVENTION

Field of the Invention

The present invention relates to an inference model construction method, an inference model construction device, a recording medium, a configuration device, and a configuration method, and relates particularly to a technique for making three-dimensional rendering representations using two-dimensional images.

Description of the Related Art

Rendering representations using 3D models have recently become mainstream in the technical field of computer graphics, including electronic games. This is because the time required for processing such as repetitive rendering and lighting computation can be reduced when frames are rendered at a plurality of consecutive time points while moving a single character or background, as in animation, for example. Especially, for interactive content such as electronic games, in which character's motion or the like changes in real time in response to operation input, rendering representations from various viewpoint positions and directions are enabled by preparing three-dimensional models, animation data, or the like, in advance. In this type of three-dimensional graphics, commonly, a three-dimensional model is constructed based on a plurality of two-dimensional images (cuts) prepared by a designer or the like, and rendering is performed by applying textures to the model.

Meanwhile, three-dimensional graphics rendered by such texture application may give an impression different from that of an initial cut prepared by the designer or the like. Three-dimensional graphics are basically for "correctly" rendering a three-dimensional model to which the texture is applied with respect to a specific viewpoint. It is therefore difficult to effectively reproduce a representation in a specific line-of-sight direction, as cuts drawn in two-dimensional images do. For this reason, game contents or the like that prioritize the attractiveness of representations unique to two-dimensional images and mainly use two-dimensional images on game screens also have a certain level of support.

Japanese Patent Laid-Open No. 2009-104570 discloses a rendering technique that enables representations of three-dimensional animation (three-dimensional representations) while maintaining the atmosphere and attractiveness of two-dimensional images drawn by a designer or the like. Specifically, in Japanese Patent Laid-Open No. 2009-104570, a two-dimensional image is broken down into parts, such as hair, eyebrows, eyes, and contour (face), and thereafter, a curved surface serving as a reference is simply allocated to the contour part in accordance with the appearance of the two-dimensional image. Then, the two-dimensional images of the other parts are geometrically deformed and moved in accordance with the spherical face of the contour that has been rotated in correspondence with the direction of the face to be represented so that various adjustments are also applicable. Thus, the designer's desired rendering representation from different directions is realized without losing the impression of the original two-dimensional image. In other words, unlike the method of simply applying textures for rendering, the method described in Japanese Patent Laid-Open No. 2009-104570 employs a method of deforming a two-dimensional image so as to realize the designer's desired rendering representation.

In the rendering technique described in Japanese Patent Laid-Open No. 2009-104570, a three-dimensional representation in an angular range including a reference direction, such as a direction from the front, can be generated by defining deformation of each part with respect to a two-dimensional image drawn from the reference direction so as to achieve a rendering representation in a different direction (angle) from the reference direction. In other words, to generate a desired three-dimensional representation, the designer needs to define deformation of each part relative to the angle (direction) at an edge in an angular range in which the designer desires to generate the three-dimensional representation, and thereafter make fine adjustments while checking whether the desired three-dimensional representation is generated at other angles (directions) in this angular range.

However, such definitions and adjustments may involve a great deal of work, and can raise concerns about the burden of these processes, especially on designers who are unfamiliar with that work.

The present invention has been made in view of the foregoing problems, and aims to provide an inference model construction method, an inference model construction device, a program, a recording medium, a configuration device, and a configuration method that enable easy generation of a representation desired by a designer using a method of obtaining a three-dimensional representation by deforming two-dimensional images.

SUMMARY OF THE INVENTION

The present invention in its first aspect provides an inference model construction method for constructing an inference model for inferring deformation, in a defined state, of each part of a two-dimensional image of a target object, with respect to a representation model for realizing a rendering representation corresponding to a state different from a reference state of the target object by deforming the part of the two-dimensional image corresponding to the reference state, wherein the defined state differs from the reference state, wherein the representation model is defined by defining deformation of each part of the two-dimensional image in at least one defined state, and is configured to realize a rendering representation corresponding to at least a state between the reference state and the defined state, the deformation of each part in the representation model is controlled by a mode of a distribution of control points set for the part, the inference model construction method comprises: obtaining the distribution of the control points pertaining to the reference state and the distribution of the control points pertaining to the defined state with respect to a defined representation model, which is the representation model that has been defined; extracting a first feature value based on the distribution of the control points pertaining to the reference state obtained in the obtaining; and machine-learning the distribution of the control points pertaining to the defined state obtained in the obtaining while using, as a label, the first feature value extracted in the extracting, and constructing an inference model based on a result of the leaning performed with respect to a plurality of the defined representation models.

The present invention in its second aspect provides an inference model construction device for constructing an inference model for inferring deformation, in a defined state, of each part of a two-dimensional image of a target object, with respect to a representation model for realizing a rendering representation corresponding to a state different from a reference state of the target object by deforming the part of the two-dimensional image corresponding to the reference state, wherein the defined state differs from the reference state, wherein the representation model is defined by defining deformation of each part of the two-dimensional image in at least one defined state, and is configured to realize a rendering representation corresponding to at least a state between the reference state and the defined state, the deformation of each part in the representation model is controlled by a mode of a distribution of control points set for the part, the inference model construction device comprises: at least one processor; and a memory configured to store instructions that, when executed by the at least one processor, cause the at least one processor to function as: an obtaining unit configured to obtain the distribution of the control points pertaining to the reference state and the distribution of the control points pertaining to the defined state with respect to a defined representation model, which is the representation model that has been defined; an extraction unit configured to extract a first feature value based on the distribution of the control points pertaining to the reference state obtained by the obtaining unit; and a learning unit configured to machine-learn the distribution of the control points pertaining to the defined state obtained by the obtaining unit while using, as a label, the first feature value extracted by the extraction unit, and constructing an inference model based on a result of the leaning performed with respect to a plurality of the defined representation models.

The present invention in its third aspect provides a non-transitory computer-readable recording medium in which is stored a program for causing a computer to execute the inference model construction method of the first aspect.

The present invention in its fourth aspect provides a non-transitory computer-readable recording medium in which is stored a program for causing a computer to configure a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the program causes the computer to execute: input processing for obtaining the distribution of the control points pertaining to the reference state with respect to a configuration target object; first determination processing for determining the first feature value based on information obtained through the input processing; inference processing for inferring, with use of the inference model, the distribution of the control points pertaining to the defined state of the configuration target object, based on the first feature value determined through the first determination processing; and output processing for configuring and outputting the representation model of the configuration target object, based on a result of the inference performed through the inference processing.

The present invention in its fifth aspect provides a non-transitory computer-readable recording medium in which is stored a program for causing a computer to configure a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the program causes the computer to execute: input processing for obtaining the distribution of the control points pertaining to the reference state with respect to a configuration target object; first determination processing for determining the first feature value based on information obtained through the input processing; second determination processing for determining the second feature value; inference processing for inferring, with use of the inference model, the distribution of the control points pertaining to the defined state of the configuration target object, based on the first feature value determined through the first determination processing and the second feature value determined through the second determination processing; and output processing for configuring and outputting the representation model of the configuration target object, based on a result of the inference performed through the inference processing.

The present invention in its sixth aspect provides a configuration device for configuring a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the configuration device comprises: an input unit configured to obtain the distribution of the control points pertaining to the reference state with respect to a configuration target object; a determination unit configured to determine the first feature value based on information obtained by the input unit; an inference unit configured to infer, with use of the inference model, the distribution of the control points pertaining to the defined state of the configuration target object, based on the first feature value determined by the determination unit; and an output unit configured to configure and output the representation model of the configuration target object, based on a result of the inference performed by the inference unit.

The present invention in its seventh aspect provides a configuration device for configuring a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the configuration device comprises: an input unit configured to obtain the distribution of the control points pertaining to the reference state with respect to a configuration target object; a first determination unit configured to determine the first feature value based on information obtained by the input unit; a second determination unit configured to determine the second feature value; an inference unit configured to infer, with use of the inference model, the distribution of the control points pertaining to the defined state of the configuration target object, based on the first feature value determined by the first determination unit and the second feature value determined by the second determination unit; and an output unit configured to configure and output the representation model of the configuration target object, based on a result of the inference performed by the inference unit.

The present invention in its eighth aspect provides a configuration method for configuring a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the configuration method comprises: obtaining the distribution of the control points pertaining to the reference state with respect to a configuration target object; determining the first feature value based on information obtained in the obtaining; inferring, with use of the inference model, the distribution of the control points pertaining to the defined state of the configuration target object, based on the first feature value determined in the determining; and configuring and outputting the representation model of the configuration target object, based on a result of the inference performed in the inferring.

The present invention in its ninth aspect provides a configuration method for configuring a representation model for realizing a rendering representation corresponding to a state different from a reference state of a target object by deforming each part of a two-dimensional image corresponding to the reference state of the target object, by using the inference model constructed with use of the inference model construction method of the first aspect, wherein the deformation of each part in the representation model is controlled by a mode of a distribution of control points set for the part, the configuration method comprises: obtaining the distribution of the control points pertaining to the reference state with respect to a configuration target object; determining the first feature value based on information obtained in the obtaining; determining the second feature value; inferring, with use of the inference model, the distribution of the control points pertaining to the defined state of the configuration target object, based on the determined first feature value and the determined second feature value; and configuring and outputting the representation model of the configuration target object, based on a result of the inference performed in the inferring.

Further features of the present invention will become apparent from the following description of exemplary embodiments (with reference to the attached drawings).

BRIEF DESCRIPTION OF THE DRAWINGS

FIG. 9 is a flowchart showing an example of construction processing executed by the construction device 100 according to the embodiment of the present invention.

FIG. 10 shows an example of a GUI for adjusting deformation of parts after inference according to the embodiment of the present invention.

FIG. 13A shows an example of a data configuration of a representation model according to the embodiment of the present invention.

FIG. 13B shows an example of a representation model according to the embodiment of the present invention (texture information).

FIG. 13C shows an example of a data configuration of a representation model according to the embodiment of the present invention (state information).

DESCRIPTION OF THE EMBODIMENTS

Embodiments

Figure 1:
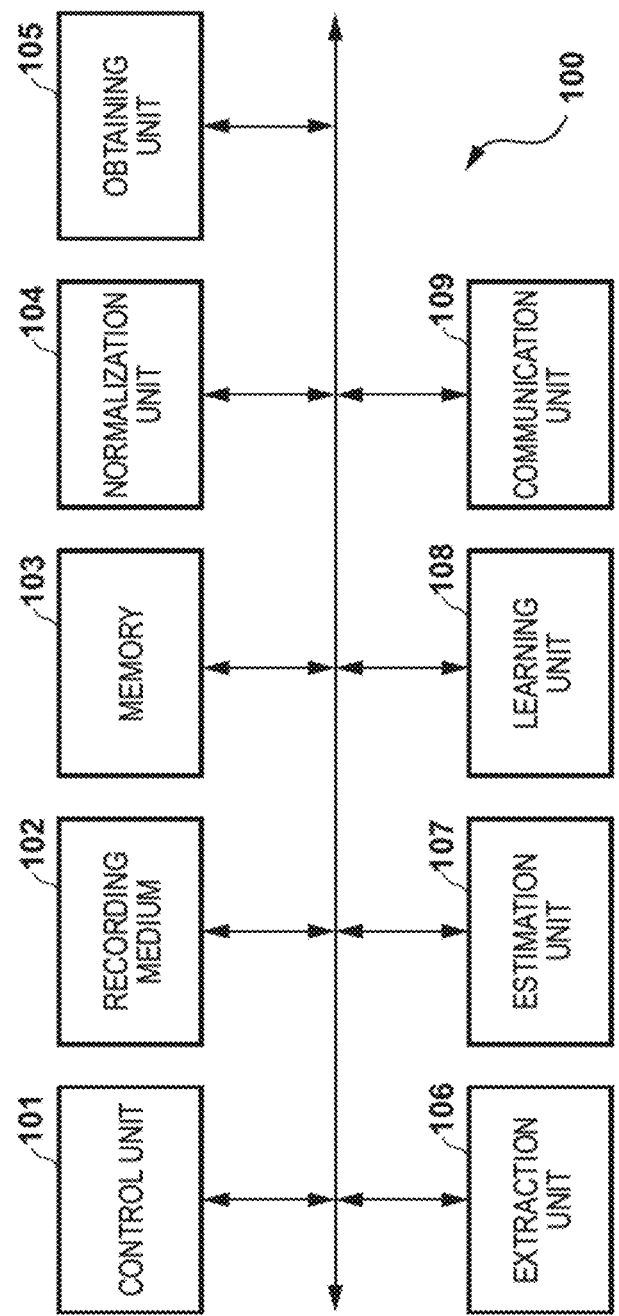
FIG. 1 is a block diagram showing a functional configuration of a construction device 100 according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

The following embodiment will describe an example of applying the present invention to a construction device that constructs an inference model by machine-learning a plurality of defined representation models, and a configuration device that configures a representation model with use of the inference model constructed by the construction device. The inference model construction device and the configuration device in the present embodiment are described as separate devices. However, the implementation of the present invention is not limited thereto. The present invention may alternatively be implemented by a single device equipped with the functionalities of the construction device and the configuration device.

The "representation model" in the present specification will be described as a data that can realize a rendering representation corresponding to a desired state (i.e., generate a two-dimensional image corresponding to this state) by deforming each part of a two-dimensional provided as an image representing a reference state of a target object, and that can realize a three-dimensional representation by continuously showing the process of the state transition. More specifically, to realize a rendering representation in a desired state, a representation model is data that contains information regarding deformation of a two-dimensional image of each part defined for a state (defined state) that is different from the reference state, and that is configured to be realize a rendering representation corresponding to a transitionable (interpolatable) state at least between the reference state and the defined state by using the technique described in Japanese Patent Laid-Open No. 2009-104570, for example. However, the representation model is not limited to one that realizes a rendering representation by means of interpolation between two defined states, and may alternatively be configured to also realize a rendering representation that is not included in a range between these two states by means of extrapolation.

The "inference" in the present specification will be described as a term that refers to deriving predetermined output based on a neural network or the like that is constituted by an inference model, by giving predetermined input to this inference model. Meanwhile, deriving a state that represented by the input by applying a predetermined calculation to the input without going through an inference model will be expressed as "estimation".

Configuration of Construction Device

FIG. 1 is a block diagram showing a functional configuration of a construction device 100 according to the present embodiment. Here, the construction device 100 may be, for example, a server or the like that is managed by a seller of a later-described editing application for configuring representation models, connects to a configuration device 200 via a network (not shown), and is capable of providing a constructed inference model.

A control unit 101 is a control device such as a CPU, and controls operation of each block of the construction device 100. Specifically, the control unit 101 controls operation of each block by reading an operation program for the block that is stored in a recording medium 102, loading the read program in a memory 103, and executing it.

The recording medium 102 is a recording device such as a nonvolatile memory, which may be a rewritable ROM or the like, or an HDD that is removably connected to the construction device 100. The recording medium 102 records information such as parameters necessary for operation of each block, in addition to the operation program for the block of the construction device 100. Also, the recording medium 102 in the present embodiment records a plurality of types of representation models used in machine learning (i.e., representation models to be learned). The memory 103 may be, for example, a volatile memory such as a RAM. Memory 103 is used not only as a loading area for loading programs or the like that is read from recording medium 102, but also as a storage area for temporarily storing intermediate data or the like that is output during operation of each block.

A normalization unit 104 executes normalization processing for normalizing the representation models to be learned so as to converge machine learning performed by a learning unit 108. The details of normalization processing executed by the normalization unit 104 will be described later. The normalized representation models may be stored in the recording medium 102.

An obtaining unit 105 reads and obtains from the recording medium 102 the representation models normalized by the normalization unit 104 in order to machine learn the representation models. The normalized representation models obtained by the obtaining unit 105 are transmitted to an extraction unit 106, an estimation unit 107, and the learning unit 108.

The extraction unit 106 extracts three types of feature values as first feature values according to the present invention, based on information regarding reference states in the normalized representation models. Although the details of the three types of feature values will be described later, the first feature values are information obtained by quantifying features of an external appearance of a target object.

The estimation unit 107 estimates two types of feature values that serve as second feature values according to the present invention, based on information regarding the reference states and defined states in the normalized representation models. Although the details of the two types of feature values will also be described later, the second feature values are different from the first feature values in that the second feature values are information obtained by estimating and quantifying factors of deformation defined for the target object.

The learning unit 108 performs machine learning for one normalized representation model transmitted from the obtaining unit 105, based on the feature values obtained regarding this representation model from the extraction unit 106 and the estimation unit 107. The learning unit 108 constructs an inference model based on the learning results obtained by learning a plurality of normalized representation models. Needless to say, the inference model may be obtained in the form of a neural network, or may be obtained in any other form.

A communication unit 109 is a communication interface of the construction device 100 for communication with an external device. The communication unit 109 connects to an external device and transmits and receives data to and from this device via a network (wired or wireless), which may be a communication network such as the Internet, or may be a local area network for connecting the devices.

Configuration of Configuration Device

Figure 2:
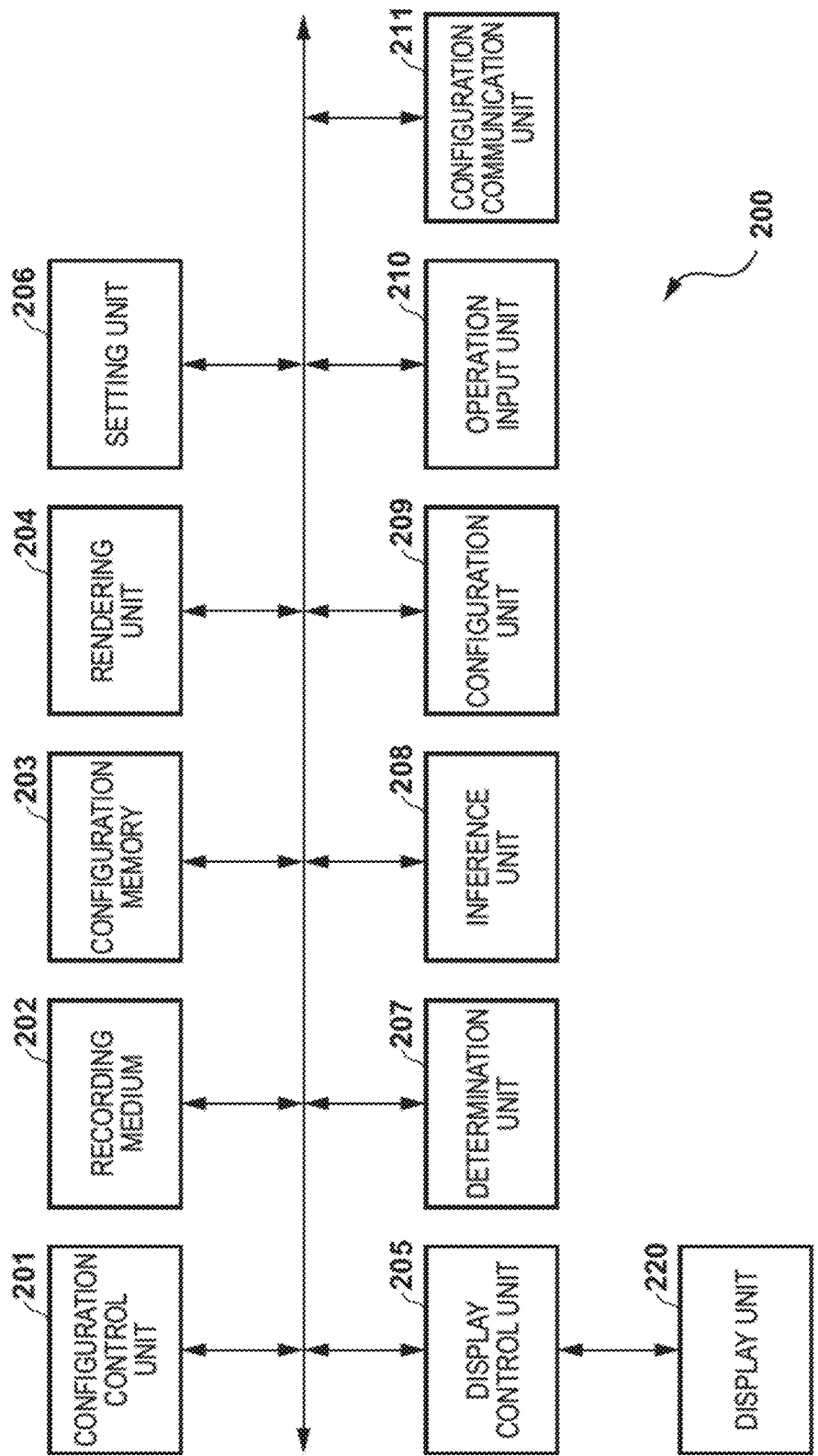
FIG. 2 is a block diagram showing a functional configuration of a configuration device 200 according to the embodiment of the present invention.

Next, a functional configuration of the configuration device 200 according to the present embodiment will be described with reference to FIG. 2. Here, the configuration device 200 may be a terminal used by an end user in which an editing application for configuring representation models is executed, and is configured to obtain an inference model from the construction device 100 via a network (not shown). Note that constituent elements of the configuration device 200 of the present embodiment that realize the same functionalities as those of constituent elements of the construction device 100 are distinguished by adding a prefix "configuration".

A configuration control unit 201 is a control device such as a CPU and controls operation of each block of the configuration device 200. Specifically, the configuration control unit 201 reads an operation program for each block and a program of a later-described editing application for configuring representation models that are stored in a configuration recording medium 202, loads the read programs in a configuration memory 203 and executes them to control operation of the block.

The configuration recording medium 202 is a recording device such as a rewritable nonvolatile memory, such as a ROM, an HDD that is removable connected to the configuration device 200, or the like. The configuration recording medium 202 records information on parameters necessary for operation of each block of the configuration device 200, in addition to the operation program for the block and the editing application program. The configuration recording medium 202 in the present embodiment also records the inference model constructed by the construction device 100. The configuration memory 203 may be, for example, a volatile memory such as a RAM. The configuration memory 203 is used not only as a loading area for loading programs or the like that is read from configuration recording medium 202, but also as a storage area for temporarily storing intermediate data or the like that is output during operation of each block.

A rendering unit 204 may be, for example, a rendering device such as a GPU, and generates an image (screen) to be displayed in a display region of a display unit 220. In the configuration device 200 of the present embodiment, the rendering unit 204 renders a two-dimensional image that realizes, with respect to at least a representation model that is being edited, an external appearance of a target object indicated by this representation model, i.e., a rendering representation of this target object in a designated state, while the editing application is being executed.

A display control unit 205 performs display control associated with display of the screen generated by the rendering unit 204 on the display unit 220. The display unit 220 may be, for example, a display device such as an LCD, and may be integrated with the configuration device 200 or may be an external device that is removable from the configuration device 200.

A setting unit 206 sets control points serving as a reference for deformation of each part in a two-dimensional image of an object that constitutes a representation model (a configuration target object). Although the details will be described later, deformation of each part associated with a change in the rendering representation realizes a change in the external appearance of the part by applying (mapping) the two-dimensional image of the part to a curved surface and changing the positions of the control points set for this curved surface to change the shape of the curved surface. For this reason, the setting unit 206 sets a distribution of the control points in the reference state on the editing application, based on user input made according to a definition of the reference state of the configuration target object. Although the user is required to set the control points to define the reference state in order to realize a representation desired by the user in the description of the present embodiment, the implementation of the present invention is not limited thereto. The setting unit 206 may alternatively set the control points based on image recognition, analysis of a layer configuration, or the like, without a user operation.

A determination unit 207 determines feature values associated with a defined state to be inferred by an inference unit 208 in order to configure a representation model of the configuration target object. The feature values determined by the determination unit 207 include the first feature values and the second feature values.

The inference unit 208 infers a distribution of the control points pertaining to the defined state of the configuration target object, using the feature values determined by the determination unit 207. The inference model constructed by the construction device 100 is used in inference performed by the inference unit 208.

A configuration unit 209 configures a representation model of the configuration target object, based on the result of inference by the inference unit 208. In other words, the configuration unit 209 configures a representation model including the distribution of the control points in the reference state that is set by the setting unit 206 and the distribution of the control points in the defined state inferred by the inference unit 208.

An operation input unit 210 is a user interface of the configuration device 200, such as a mouse, a keyboard, and a pen tablet. Upon detecting operation input made via any of various interfaces, the operation input unit 210 outputs a control signal corresponding to the operation input to the configuration control unit 201. The operation input unit 210 notifies the configuration control unit 201 of the occurrence of an event corresponding to the operation input.

A configuration communication unit 211 is a communication interface of the configuration device 200 for communication with an external device. The configuration communication unit 211 connects to an external device and transmits and receives data to and from this device via a network (wired or wireless), which may be a communication network such as the Internet or a local area network for connecting the devices.

Configuration of Representation Model

Next, a detailed configuration of a representation model used in the present embodiment will be described. In the description of the present embodiment, an object to which a rendering representation is provided by a representation model is a character that at least includes the head, and a two-dimensional image representing an external appearance of the character is displayed by presenting the representation model.

Figure 3A:
FIG. 3A shows an example of a rendering representation (reference state) of a representation model according to the embodiment of the present invention.

The external appearance of the character indicated by the representation model is constituted by two-dimensional images of various parts (face, left eye, right eye, nose, mouth, bangs etc.) of the character's head configured for the forward orientation of the character, as shown in FIG. 3A. The two-dimensional image of each part is independently deformable, or is deformable in conjunction with deformation of other parts. The deformation is controlled in accordance with the state of the displayed character. In other words, a representation model is configured to realize a rendering representation of a character in a state different from the reference state by deforming a two-dimensional image of the character facing forward, which is the reference state, rather than by switching to a two-dimensional image unique to each state of the displayed character.

To realize a rendering representation in a state different from the reference state, the user needs to define a rendering representation corresponding to at least one state different from the reference state in the representation model. The user can set a state (defined state) in which a desired rendering representation appears, in addition to the reference state, and define a rendering representation to appear in the thus-set defined state by deforming each part of the character in the reference state. Thus, the representation model can derive a deformation mode of each part and realize the corresponding rendering representation for states in a range (hereinafter referred to as a "movable range") specified by at least the reference state and the defined state. In the following, a representation model in which deformation in at least one defined state is thus defined and that can realize a rendering representation of a state different from the reference state will be referred to as a "defined representation model". A representation in which deformation in no defined state has been defined and that can realize only the rendering representation of the reference state will be referred to as an "undefined representation model".

Figure 3B:
FIG. 3B shows an example of a rendering representation (defined state) of a representation model according to the embodiment of the present invention.

For example, if a character facing forward, such as that in FIG. 3A, is defined as a reference state, a rendering representation of the character in an oblique orientation, such as that shown in FIG. 3B, can be defined as a defined state by deforming the two-dimensional image of each part of the character in the reference state, and a rendering representation corresponding to each state in the movable range specified between the reference state and that defined state can be realized. For ease of understanding of the invention, the states shown in FIGS. 3A and 3B are defined in the representation model described in the present embodiment, and this representation model is configured to realize rendering representations of the head of a single character turning in a yaw direction. Here, the turning in the yaw direction is not limited to motion caused due to the head (or the entire character) rotating in the yaw direction without a movement of the character's position, such as the character shaking the head, but also includes a movement caused due to a change in appearance that occurs with the character moving to the side (a mode in which the character is viewed from an oblique direction due to a shift from an optical axis (line-of-sight direction) of a camera that performs rendering). However, the implementation of the present invention is not limited thereto. The representation model may alternatively include a plurality of types of defined states, such as an orientation change to another direction and translational movement, or a specific movement and a transition of facial expression, and may be configured to realize transition of the rendering representation from the reference state to any of the defined state, or from the reference state and a combined state of these defined states.

In the present embodiment, deformation of two-dimensional images of parts in the representation model is realized by applying these two-dimensional images as textures to curved surfaces (including a flat surface) and changing the shape of these curved surfaces. More specifically, to determine the shape of the curved surfaces, each curved surface is provided with a plurality of control points for specifying its shape. A change in the shape of the curved surface and deformation of the applied two-dimensional image are realized by changing the distribution of these control points. In the description of the present embodiment, deformation of a two-dimensional image is realized by applying the two-dimensional image as a texture to a curved surface and changing the shape of this curved surface. However, the implementation of the present invention is not limited thereto. In other words, deformation of a two-dimensional image of a part may be simply controllable directly using the distribution of the control points provided for the two-dimensional image, without using the indirect concept of curved surfaces.

Figure 4A:
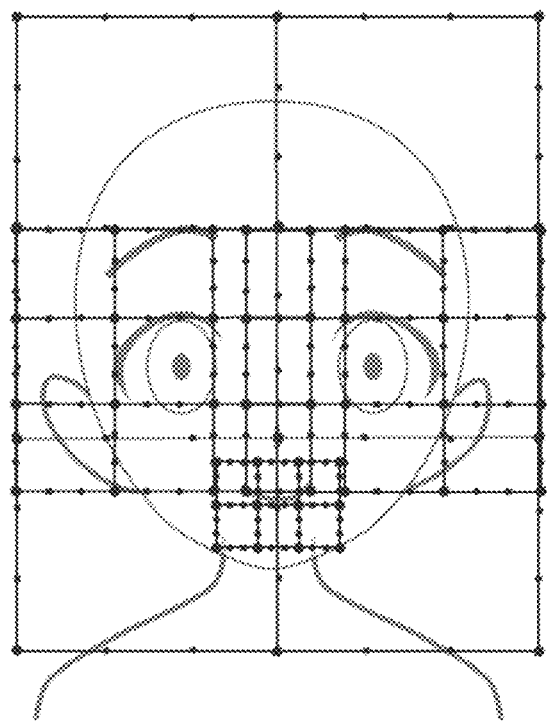
FIG. 4A is a diagram for illustrating deformation of parts according to the embodiment of the present invention (reference state).
Figure 5A:
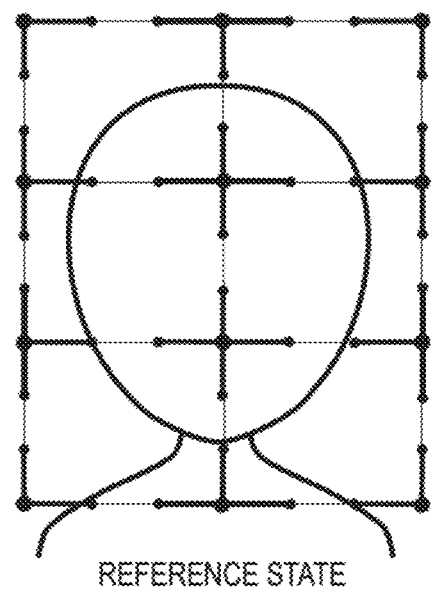
FIG. 5A is a diagram for illustrating a control point group associated with deformation of parts according to the embodiment of the present invention (reference state).
Figure 5B:
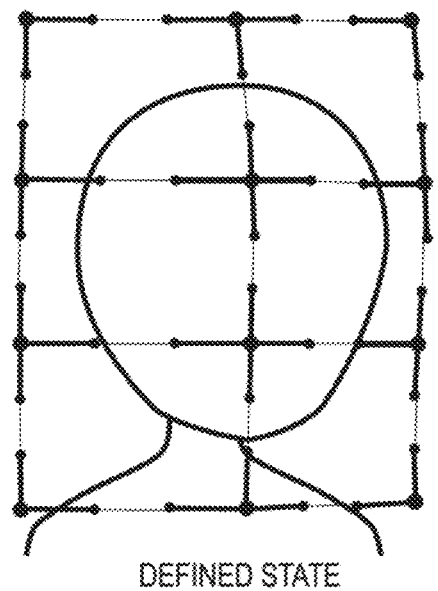
FIG. 5B is another diagram for illustrating a control point group associated with deformation of parts according to the embodiment of the present invention (defined state).
Figure 5C:
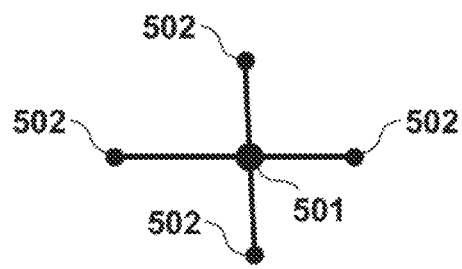
FIG. 5C is a diagram for illustrating a control point group associated with deformation of parts according to the embodiment of the present invention.

Curved surfaces and control points are set for two-dimensional images of respective parts in the reference state, as shown in FIG. 4A, for example. Here, control points set for one part may be such that the number and distribution of the control points are determined in accordance with the fineness required for a required deformation representation of the part. For example, for the reference state and the defined state of face part, a control point group is set at not only four corners (vertices) of curved surfaces (rectangle) to which these states are applied, but also midpoints that divide sides of the curved surfaces into a predetermined number of sections (two horizontally and three vertically in the shown example) and intersection points defined by connecting these midpoints, as shown in FIGS. 5A and 5B. The control point group set at each of the vertices, midpoints, and intersection points in FIGS. 5A and 5B may include a control point 501 that corresponds to an anchor point defining the position of a point corresponding to the curved surface, and control points 502, which defines a direction line of a curve (a bent line, a Bezier curve etc.) connecting adjacent control points (or any other control points on their extensions), as shown in FIG. 5C.

Figure 4B:
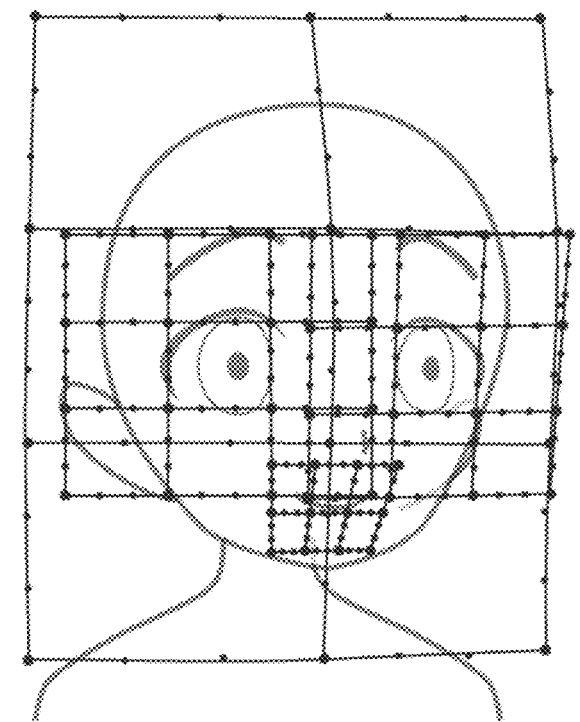
FIG. 4B is a diagram for illustrating deformation of parts according to the embodiment of the present invention (defined state).

A rendering representation of the character in a defined state is defined by changing the distribution of these control points for each part, as shown in FIG. 4B, for example. Although the examples shown in FIGS. 4A and 4B illustrate the distributions of the control points (shape of curved surfaces) only for the character's face, eyes, and mouth parts so that the distributions of the control points can be easily observed, it is needless to say that deformation may also be defined for any other parts as well.

After the deformation of the two-dimensional image of each part is thus defined, a rendering representation of any state included in the movable range defined by the reference state and the defined state can be derived by interpolation with use of the placement coordinates of the control points in these states. More specifically, the state to be rendered (target state) can be specified by the internal ratio between the reference state and the defined state. Therefore, the placement coordinates of the control points pertaining to the target state can be derived by weighting and adding the placement coordinates of the same control points in the reference state and the defined state based on the internal ratio. In other words, when rendering the character using a defined representation model, the target state can be specified by the internal ratio in the movable range, and a rendering representation of the target state can be generated using the internal ratio as input.

Accordingly, for example, the representation model may include, in association with a model ID 1301 that uniquely identifies the representation model, texture information 1302 indicating various information regarding two-dimensional images of various parts of the character pertaining to the representation model, reference state information 1303 indicating the distribution of control points defined for various parts with respect to the reference state, and defined state information 1304 indicating the distribution of control points defined for various parts with respect to the defined state, as shown in FIG. 13A. For ease of understanding the invention, one type of defined state other than the reference state is defined in the representation model in this embodiment, as mentioned above. Thus, only one type of defined state information 1304 is included in the representation model data. However, the implementation of the present invention is not limited thereto, and it is needless to say that the same number of types of defined state information 1304 as the number of defined states may be included. In this case, each piece of the defined state information 1304 includes identification information that uniquely identifies a defined state.

Here, for example, the texture information 1302 on the defined state need only include, for each of the parts constituting the character, a role ID 1312 indicating a role (right eye, nose, face etc.) of the part in the external appearance of the character, a two-dimensional image 1313 of the part, detailed information 1314 storing various information, such as the size of the two-dimensional image of the part, and application-target curved surface information 1315 storing the size of the curved surface to which the two-dimensional image of the part is applied, a list of set control points, and so on, in association with a part ID 1311 that identifies the part, as shown in FIG. 13B. The reference state information 1303 and the defined state information 1304 need only be configured to manage, for each part, a control point ID 1322 that uniquely specifies the control point and placement coordinates 1323 of the control point in the target state for each of the control points provided to the curved surface pertaining to the part, in association with the part ID 1321 that identifies the part, as shown in FIG. 13C, for example.

Although a detailed description of the placement coordinates of control points is omitted, it is needless to say that the placement coordinates may be absolutely specified relative to the center that is a predetermined origin provided for the entire character, or may be relatively specified around the center at predetermined coordinates of a part for which the control points are set or another part with which the relevant part is associated, for example.

Construction of Inference Model

Next, a description will be given of construction of an inference model performed by the construction device 100 of the present embodiment based on machine learning of a plurality of representation models with defined distributions of control points in the reference state and the defined state. Although the details will be described later, a distribution of control points pertaining to a new defined state can be inferred for a representation model (undefined representation model) in which only the distribution of the control points pertaining to the reference state is defined, by using the inference model constructed by the construction device 100.

Normalization of Representation Model

Figure 6A:
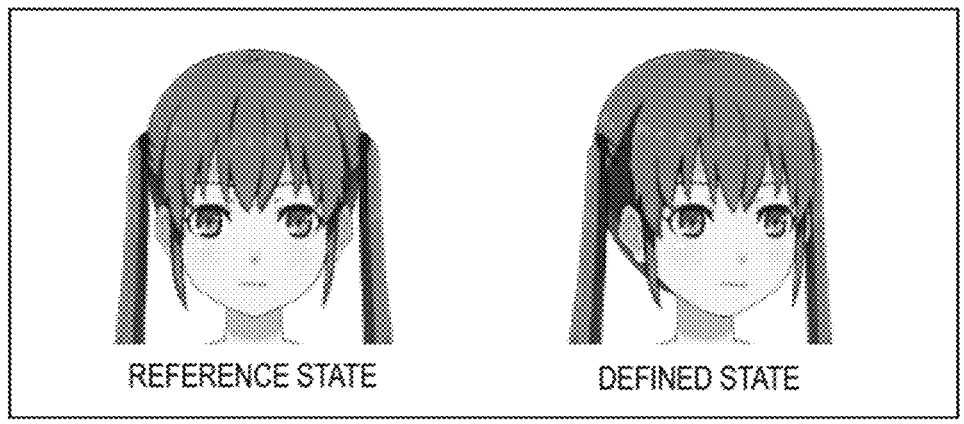
FIG. 6A is a diagram for illustrating a difference in a movable range between representation models according to the embodiment of the present invention.
Figure 6B:
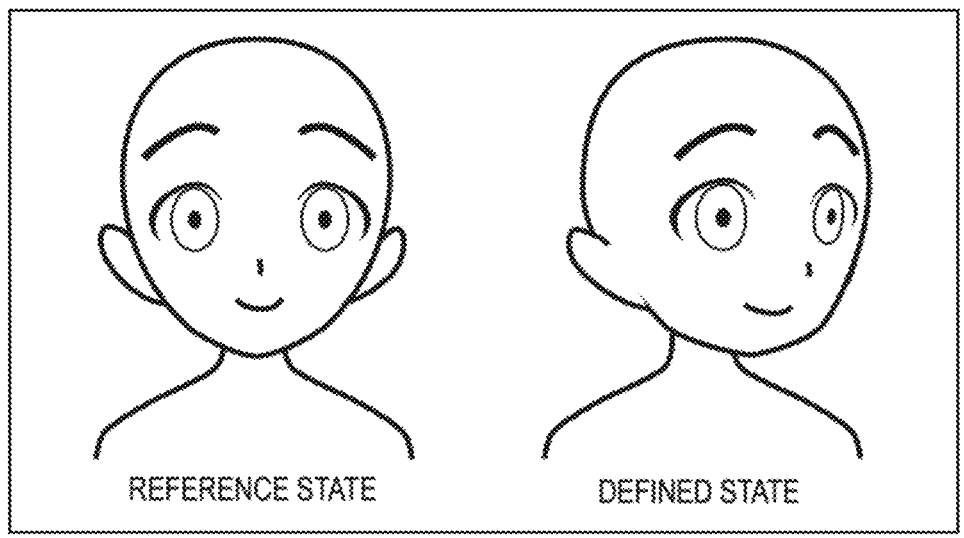
FIG. 6B is another diagram for illustrating a difference in a movable range between representation models according to the embodiment of the present invention.
Figure 6C:
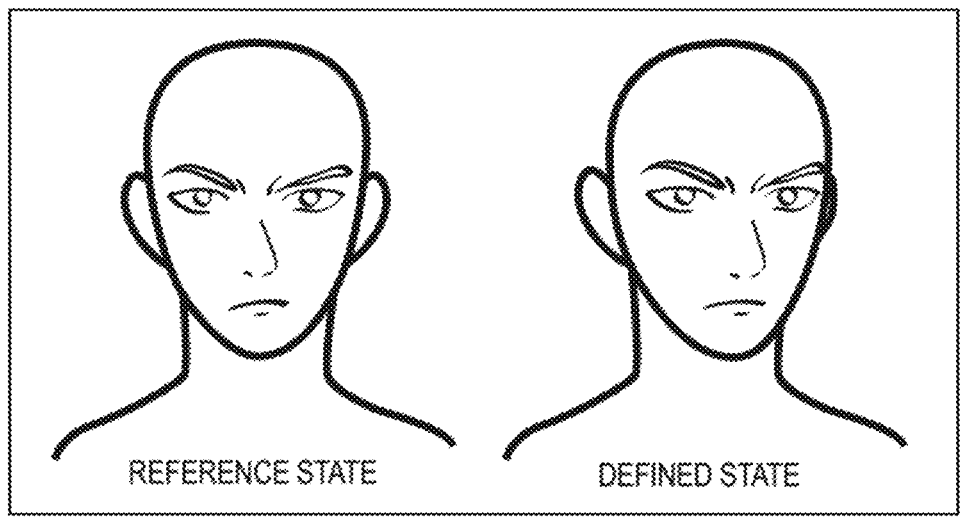
FIG. 6C is yet another diagram for illustrating a difference in a movable range between representation models according to the embodiment of the present invention.

An inference model is constructed by the learning unit 108 performing machine learning using a plurality of defined representation models as training data. Although the movable ranges specified by the representation models do not necessarily coincide with each other, it is difficult to machine-learn the distributions of the control points indicated by representation models in various modes as-is. More specifically, even if all reference states show characters facing forward as shown in FIGS. 6A to 6C, the mode of rendering representation in a defined state is not common to all the representation models. Therefore, simply learning the distributions of control points pertaining to the defined states in these representation models does not lead to construction of a favorable inference model.

This is because the rendering representation of the defined state depends on the representation method adopted by the designer and/or the use application of the representation model.

Even if the representation models are configured to present turning motion of the character's head in the yaw direction as in the present embodiment, the angle range in which the representation models can realize the rendering representation of the turning motion depends on the environment in which the representation models are used. For example, when a representation model is used in a chat system that presents a character in a bust shot whose behavior is controlled according to the user's real-world motion, it is preferred to exaggerate the character's motion compared to the user's real-world motion or to increase the width of the character's motion to make it stand out more. Therefore, the angular range required to achieve a rendering representation in the representation model becomes wider. On the other hand, when a representation model is used in adventure games that present a substantially entire body (medium shot, full shot) of the character, such as standing pictures, the range of motion of the character is not very demanding. Therefore, the angular range required to realize a rendering representation in the representation model is narrower.

In addition, there are only a limited number of cases in which, specifically, a rendering representation of a character viewed from an oblique angle is designed by strictly defining a specific numerical value of the turning angle from the front (viewing angle relative to the forward direction). In most cases, a rendering representation that is considered suitable by the designer's sense is designed. Therefore, in an attempt to learn a certain representation model, it is difficult to derive the value of the turning angle indicated by the rendering representation of the defined state in this representation model. On the other hand, even when a design is made by specifying the value of the turning angle, the representation method adopted by different designers can vary, resulting in differences in the rendering representation (placement and deformation of parts) of the defined state even in representation models for the same use.

In addition, in a representation model in which a change in appearance due to the character moving to the side is specified so as to include a rendering representation similar to turning in the yaw direction, parts are specified while being shifted in the direction of movement as whole in the rendering representation of the defined state. For this reason, a difference in rendering representation of the defined state can also occur depending on the presence or absence of translation, even between representation models that realize a turning representation in the yaw direction.

Accordingly, since there are differences in feasible rendering representation even between defined representation models, the construction device 100 of the present embodiment applies normalization processing to defined representation models and then uses them as teacher data in order to obtain favorable learning results.

Here, the defined representation models may be normalized mainly through two processes, namely "scale normalization" and "normalization of the amount of deformation".

First, it is favorable that the size of a two-dimensional image of the character used in the representation models is optimized in accordance with the use of the representation models. That is, since the size of the range in which control points are distributed also differs between the representation models, the normalization unit 104 normalizes the scale based on the placement of the character's eye parts, which serve as first-type parts according to the present invention, in the reference state.

Figure 7A:
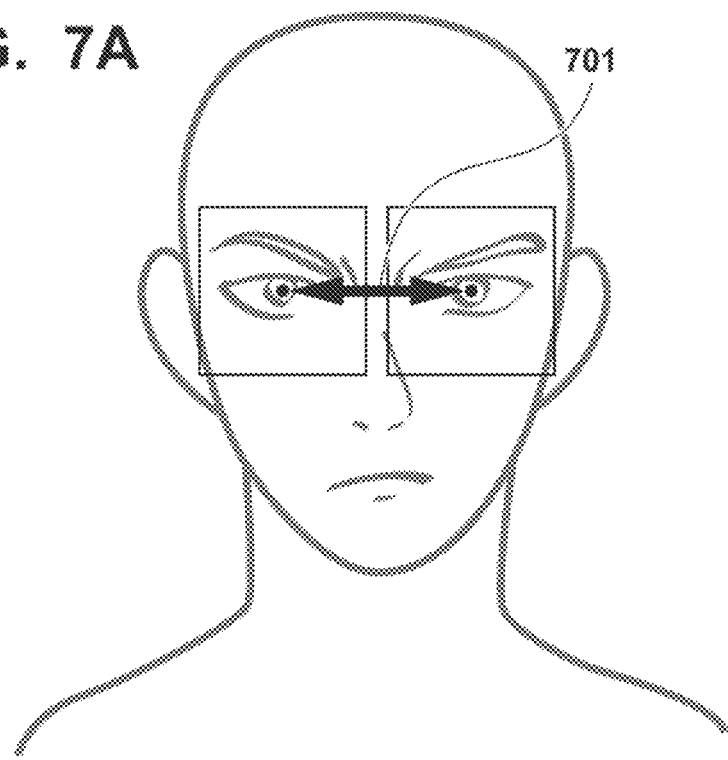
FIG. 7A is a diagram for illustrating normalization of a representation model according to the embodiment of the present invention.

First, the normalization unit 104 references the reference state information 1303 in the representation model data, and derives an interocular distance 701 in the representation model from the placement coordinates of the left and right eye parts (e.g., the center coordinates of the curved surfaces, the placement coordinates of the control points allocated to the pupils), as shown in FIG. 7A. The normalization unit 104 then divides the values of the placement coordinates 1323 in the reference state information 1303 and the defined state information 1304 by the interocular distance, thereby configuring the representation model data with the normalized scale.

Although scale normalization is based on the distance between the left eye part and the right eye part in the description of the present embodiment, the implementation of the present invention is not limited thereto. It is needless to say that that scale normalization may alternatively be based on the placement of any other parts.

Figure 7B:
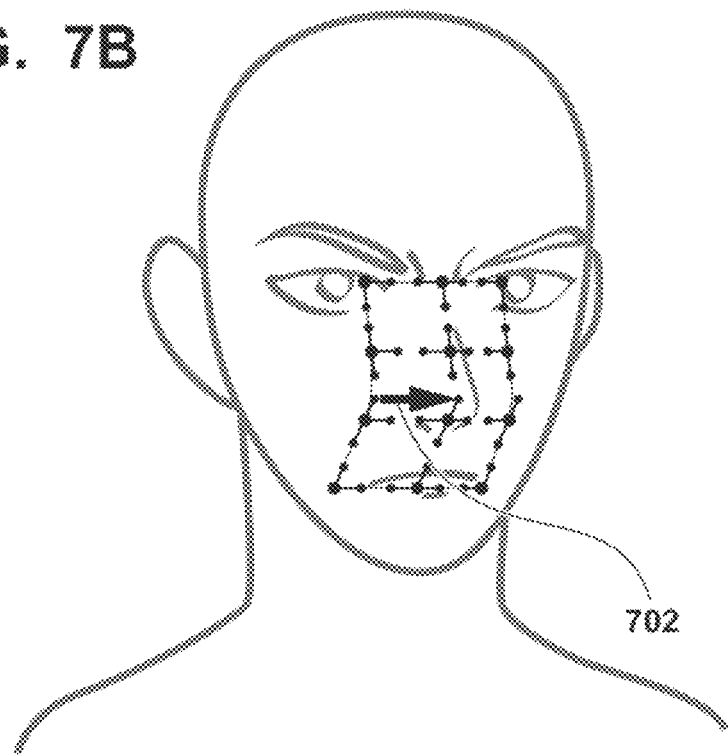
FIG. 7B is another diagram for illustrating normalization of a representation model according to the embodiment of the present invention.

Next, the rendering representation of the character presented by the defined state differs between representation models, i.e., the amount of deformation in the defined state (from the reference state) differs even for the same part, as mentioned above. Therefore, the normalization unit 104 normalizes the amount of deformation for the normalized models with the normalized scale, based on the amount of movement of a control point that is set at the nose head of the character's nose part, which serves as a second-type part according to the present invention. This is because, in a mode in which the representation models are configured to present turning motion of the character's head in the yaw direction, as in the present embodiment, the region of the character's head that should be farthest away from the rotation axis of the turning is the nose head, and a movement (702) caused by the turning motion can characteristically appear as shown in FIG. 7B.

The normalization unit 104 configures the defined representation model data to be used as training data by adjusting the defined state information 1304 in the representation model data with the normalized scale so that the amount of movement of the placement coordinates 1323 of the control point ID 1322 set at the nose head from the reference state to the defined state takes a predetermined value (fixed value). Here, when M denotes the amount of movement of the control point at the nose head from the reference state to the defined state in the representation model data before the amount of deformation is normalized, pf and p respectively denote the placement coordinates of a certain control point in the reference state and the defined state, and D denotes the amount of movement (fixed value) of the control point at the nose head after the normalization, the placement coordinates p' of a certain control point in the defined state in the representation model data after the amount of deformation is normalized can be derived by $$p' = (p - pf) \times D/M$$

The amount of deformation due to the turning motion can thus be normalized for rendering representations of the defined states in different representation models. Representation models that absorb some degree of difference in the movable range between representation models can be obtained as training data. In the following, a defined representation model in which the normalization of the scale and the amount of change has been completed will be referred to simply as a "normalized representation model".

The control point at the nose head may be identifiable by associating the role ID with information indicating the nose head when the control point is defined, or may be identified as the control point with the largest amount of movement of the horizontal coordinate among the control points set for the nose parts, for example.

Although the amount of deformation is normalized based on the amount of movement of the control point set at the nose head in the description of the present embodiment, the implementation of the present invention is not limited thereto, as with the scale normalization. The normalization performed to equalize the movable range between representational models may be based on a specific control point included in a particular part.

Feature Values Pertaining to Normalized Representation Models

In machine learning of the normalized representation models (distributions of control points for the defined state), feature values that appear in the normalized representation models are given as labels. In the normalized representation models in the present embodiment, the first feature values extracted from the reference state and the second feature values estimated based on the reference state and the defined state are used as labels. These feature values will be described below with reference to the drawings.

The first feature values are information obtained by quantifying features (e.g., long face, large eyes etc.) of the character's face pertaining to the normalized representation models. The extraction unit 106 extracts, as the first feature values of the normalized representation models, the size of the two-dimensional image of each part, the size of the curved surface to which this two-dimensional image is applied (which is, for example, obtained based on the placement coordinates of control points set for four corners of the curved surface), and the center coordinates (e.g., the placement coordinates of the control point set for the center position), in the reference state.

Here, the content of the deformation to be represented can be characteristically learned by including, in the feature values, the size of the curved surface to which the two-dimensional image is applied, in addition to the size of the two-dimensional image of each part. If, for example, the size of the two-dimensional image to be applied is relatively small with respect to the size of the curved surface, the effect of the deformation on the two-dimensional image is small even if the curved surface is deformed. Conversely, if, for example, the size of the two-dimensional image to be applied is relatively large with respect to the size of the curved surface, the deformation of the curved surface has a greater effect on the two-dimensional image. Accordingly, since the degree of deformation to be represented can vary depending on the ratio of the size of the two-dimensional image of each part and the size of the curved surface to which the two-dimensional image is applied, the construction device 100 of the present embodiment can learn the characteristics of the deformation to be represented while more finely classifying these characteristics by including these sizes in the first feature value.

Meanwhile, the second feature values are not explicitly represented by the normalized representation models, but are information quantified by estimating the type of motion that causes deformation of each part.

Here, assuming a use in which a distribution of control points pertaining to the defined state in an undefined representation model is generated by using the results of inference with the inference model constructed by the construction device 100, it can be imagined that it is desirable to be able to change the obtained inference results in accordance with the type of motion desired by the designer. In other words, when a distribution of control points pertaining to the defined state in an undefined representation model is generated, it can be considered to be that improves convenience for the designer if the amount of deformation of parts caused by rotation of the character and the amount of deformation of parts caused by a translation of the character are inferred according to the factors (rotation and translation) of the required turning motion for the defined state, and the distribution of control points can be determined based on the amount of deformation obtained by adding up these inference results. That is to say, it is favorable that deformation of parts in the representation models to be used as training data are learned such that the deformation can be separated into components generated by a rotation of the character (rotational components) and components generated by a translation of the character (translational components) and separately inferred.

As mentioned above, however, deformation of parts defined varies depending on the use of a representation model, and the deformation mode of parts in the defined state also differs depending on the representation method adopted by the designer. It is, therefore, difficult to specify from the representation model alone information regarding the motion that is assumed to have caused the deformation at the design stage. In other words, it is difficult, for example, to specify how much of deformation of parts pertaining to the defined state is due to a rotation of the character and how much is due to a translation of the character, or whether the deformation is not simply due to motion but depends on the representation adopted by the designer.

Accordingly, for the normalized representation models to be used as training data, the construction device 100 of the present embodiment does not separate the distribution of control points pertaining to the defined state in accordance with factors (translation) and rotation) of deformation, but instead performs learning while using, as labels, the second feature values indicating the amount of translation and the amount of rotation that are estimated by the estimation unit 107 with respect to the distribution of control points in a state where these factors are combined.

Figure 8A:
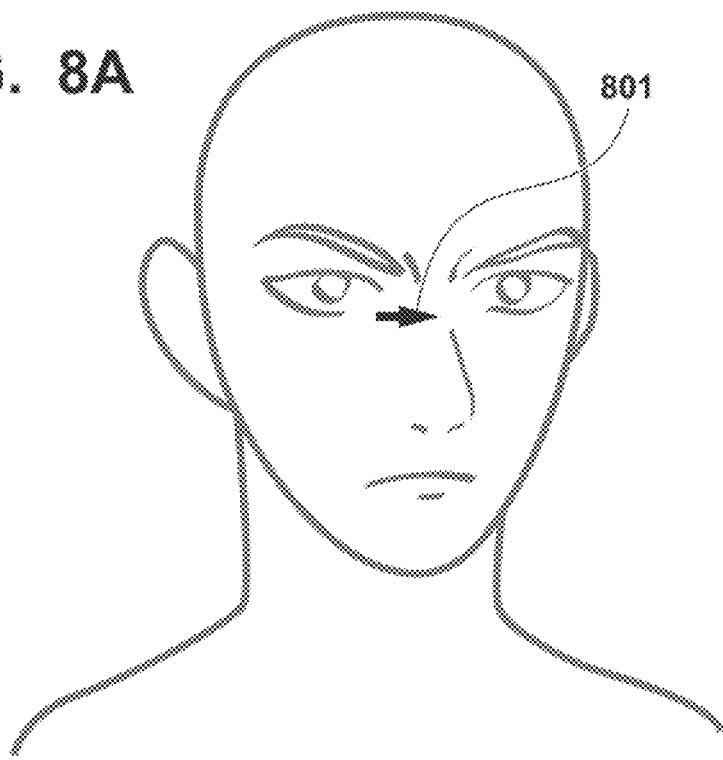
FIG. 8A is a diagram for illustrating second features value according to the embodiment of the present invention.

Information indicating the amount of translation is estimated based on the control points set for a face part serving as a third-type part according to the present invention. The estimation unit 107 in the present embodiment derives, as information indicating the amount of translation, an amount of movement 801 of a control point set at the center of the face part from the reference state to the defined state in the normalized representation models, as shown in FIG. 8A.

In the description of the present embodiment, the amount of translation in motion pertaining to the defined state is estimated based on the amount of movement of the control point set at the center of the face part. However, the implementation of the present invention is not limited thereto. For example, the estimation may alternatively be performed based on the amount of movement of at least one control point set for a face part, such as control points set for the four corners of a curved surface pertaining to the face part, or may be performed based on control points set for parts other than the face indicating the position of the character's head.

Figure 8B:
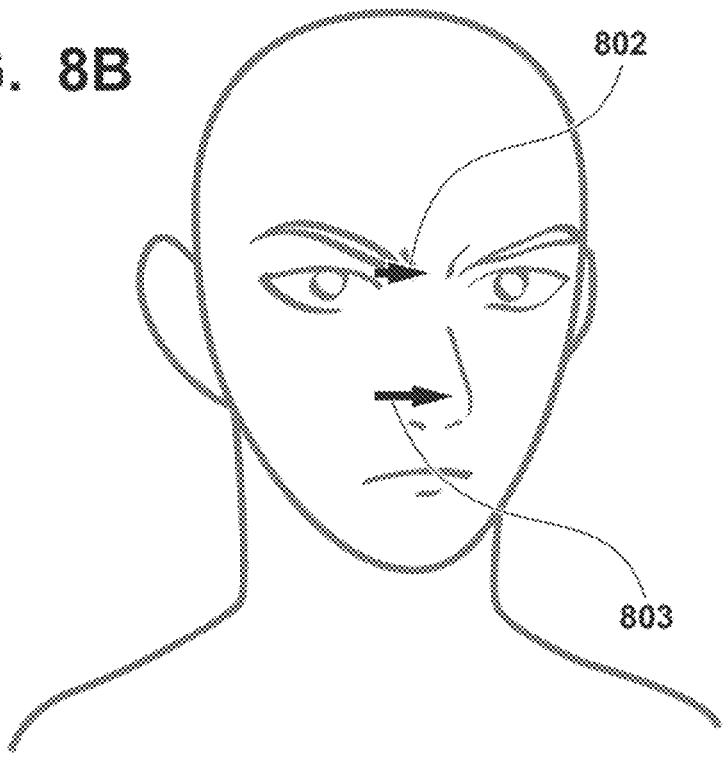
FIG. 8B is a diagram for illustrating the second feature values according to the embodiment of the present invention.

Meanwhile, information indicating the amount of rotation is estimated based on control points set for the left eyebrow, right eyebrow, and nose parts, which serve as fourth-type parts according to the present invention. The estimation unit 107 in the present embodiment derives, as an amount of movement 802 pertaining to the forehead, an average value of the amount of movement of control points set at the inner ends of the left and right eyebrow parts from the reference state to the defined state, and derives, as information indicating the amount of rotation, a difference between the amount of movement 802 and an amount of movement 803 of a control point set at the nose head from the reference state to the defined state, as shown in FIG. 8B. This utilizes the length of a path drawn when a point placed in a three-dimensional space is rotated about a certain rotation axis varying depending on the distance from the rotation axis (rotation radius). In other words, in the present embodiment, it is assumed that a difference occurs in the amount of movement due to the rotation radius between the positions of the forehead and the nose head that are aligned with the median line of the character and express unevenness of the character's face, and this difference is obtained as information indicating the amount of rotation.

Similarly to the information indicating the amount of translation, the information indicating the amount of rotation is not limited to being estimated based on the control points set for the left eyebrow, right eyebrow, and nose parts, but may alternatively be estimated based on control points set for any parts that express unevenness in the character's head.

The learning unit 108 machine-learns the distribution of control points in the normalized representation models while using the thus-obtained first and second feature values as labels, and constructs an inference model based on the obtained learning results. Although the details will be described later, the inference model constructed by the construction device 100 of the present embodiment receives as input the representation models in which the reference state is defined (more specifically, two-dimensional images corresponding to the reference state and distributions of control points pertaining to the reference state of a character configured by the representation models), and infers and outputs a distribution of control points pertaining to the defined state.

Construction Processing

A description will be given below, with reference to the flowchart in FIG. 9, of specific construction processing executed by the construction device 100 of the present embodiment to construct an inference model based on the normalized representation models. Processing corresponding the flowchart is realized by, for example, the control unit 101 reading a corresponding processing program recorded in the recording medium 102, loading the program to the memory 103 and executing it. In the following description, the construction processing starts upon an instruction to construct an inference model being accepted after a plurality of normalized representation models recorded in the recording medium 102 are designated, for example. Before the construction processing is executed, the normalization unit 104 executes normalization processing in advance for the representation models to be learned, and the obtained normalized representation models are stored in the recording medium 102.

In step S901, the obtaining unit 105 reads from the recording medium 102 one normalized representation model (target model) from which feature values have not been obtained, out of the plurality of normalized representation models to be learned, under the control of the control unit 101.

In step S902, the extraction unit 106 extracts the first feature values from information regarding the reference state in the target model, under the control of the control unit 101. More specifically, the extraction unit 106 extracts, as the first feature values, information representing the size of a two-dimensional image of each part, the size of the curved surface to which the two-dimensional image is to be applied, and the center coordinates, based on the texture information 1302 and the reference state information 1303 in the data of the target model.

In step S903, the estimation unit 107 estimates the second feature values based on information regarding the reference state and the defined state in the target model, under the control of the control unit 101. More specifically, the estimation unit 107 estimates the amount of translation and the amount of rotation pertaining to deformation of the parts and obtains, as the second feature values, information indicating the estimated amount of translation and amount of rotation, based on the reference state information 1303 and the defined state information 1304 in the data of the target model.

In step S904, the control unit 101 determines whether or not the first and second feature values have been obtained from all of the plurality of normalized representation models to be learned. The control unit 101 advances the processing to step S905 if it is determined that the first and second feature values have been obtained from all of the plurality of normalized representation models to be learned. The control unit 101 returns the processing to step S901 if it is determined that the first and second feature values have not been obtained from all of the plurality of normalized representation models to be learned, i.e., there are normalized representation models from which these feature values have not been obtained.

In step S905, the learning unit 108 machine-learns the distribution of control points pertaining to the defined state in the plurality of normalized representation models to be learned while using training data with labels that are the first feature values extracted in step S902 and the second feature values obtained in step S903, and constructs an inference model, under the control of the control unit 101. The machine learning in this step is repeated until the difference (loss function) between the distribution of control points output by the inference model for the labels of the training data and the distribution of control points in the training data converges.

In step S906, the learning unit 108 outputs an inference model constructed based on the results of learning performed for the plurality of normalized representation models to be learned, and completes the construction processing, under the control of the control unit 101.

Thus, according to the construction device of the present embodiment, an inference model that enables inference of a deformation mode of each part can be constructed by using as training data a plurality of representation models in which various rendering representations in the defined state are defined.

Configuration of Representation Model Using Inference Model

Next, a description will be given of configuration of a defined representation model performed by the configuration device 200 of the present embodiment using the results of inference with the inference model.

After obtaining the inference model constructed by the construction device 100 of the present embodiment as described above, the configuration device 200 can infer deformation of each part for an undefined state. More specifically, if a two-dimensional image of each part and a distribution of control points pertaining to a curved surface to which the two-dimensional image is to be applied have been set for the reference state of the configuration target object, a distribution of control points pertaining to a defined state can be obtained by giving, as input, the first feature values extracted based on the reference state to the inference model.

Here, since the inference model is based on machine learning performed while using the first and second feature values as labels, appropriate second feature values need to be given to perform inference. However, the second feature values are information indicating the amount of translation and the amount of rotation regarding a distribution of control points pertaining to a defined state that is to be defined by inference, these parameters do not exist for an undefined state. Moreover, a deformation mode of parts pertaining to an undefined state depends on a desire of a user (designer) who gives an instruction to execute inference. However, there is no absolute measure for information indicating the amount of translation and the amount of rotation either, and it is therefore unrealistic to make the designer designate specific numerical values before inference. For this reason, the construction device 100 of the present embodiment outputs, in advance, average values of the second feature values (amount of translation and amount of rotation) pertaining to all the normalized representation models learned to construct an inference model so that the configuration device 200 can perform inference using these average values as initial values.

In the description of the present embodiment, the average values of the second feature values in all the normalized representation models used in learning are used as initial values of the second feature values when inference is performed for an undefined state. However, the implementation of the present invention is not limited thereto. For example, the second feature values may be derivable based on predetermined features that appear in the reference state, or may be set in accordance with the use of the representation model.

Thereafter, inference is performed using the inference model based on the first feature values obtained with respect to the reference state of the configuration target object and the initial values of the second feature values obtained from the construction device 100. Thus, a distribution of control points pertaining to a predetermined defined state (which depends on the second feature values) of the configuration target object is output as the inference result. The configuration unit 209 stores the distribution of control points of this inference result in the defined state information 1304 in the data of the representation model pertaining to the configuration target object, thereby configuring this representation model in a defined state.

Meanwhile, after setting the distribution of control points pertaining to the defined state, the two-dimensional image of each part can be deformed to display the representation model, i.e., the defined state of the configuration target object can be visually presented. The designer can thus check whether the defined state is a desired rendering representation. Accordingly, the editing application of the present embodiment is provided with a graphical interface (GUI) with which, after the inference with the inference model, deformation of parts pertaining to the defined state can be adjusted with respect to the distribution of control points obtained by the inference, so that the rendering representation of the defined state can be adjusted to change the mode based on the initial values of the second feature values to another mode.

As mentioned above, it is difficult to specify factors of deformation of parts defined in a defined representation model. Therefore, the results of inference with the inference model constructed by the construction device 100 of the present embodiment can include movement of control points of translational components and rotational components. In this editing application, in order to make it easy to adjust the inference result to a rendering representation desired by the designer, the configuration device 200 separates the distribution of control points in the inference result into translation components and rotation components, and adjusts the degree of translation and rotation. Thereafter, the distributions of these control points are combined to obtain a distribution of control points pertaining to the adjusted defined state. Here, the separation into the translation components and the rotation components may be performed by, for example, deriving the amount of translation based on the amount of movement (from the reference state) of the center position of a specific part, such as a face part, and regarding, as the rotational components, the distribution obtained by subtracting the amount of translation from the placement coordinates of all control points in the inference result, and regarding, as the translational components, a difference between the inference result and the rotation component, i.e., a distribution that increases the placement coordinates of all control points by the amount of translation.

The GUI may be configured so as to be capable of accepting adjustment of at least either the amount of translation (translational level) or the amount of rotation (rotational level) with respect to deformation of each part in the defined state, as shown in FIG. 10, for example. Upon adjustments (changes in slider values) being made via the GUI, the defined state information 1304 in the data of the target representation model is changed, and the changed rendering representation of the defined state is displayed on the display unit 220. If at least either the amount of translation or the amount of rotation is adjusted, the placement coordinates of the control points of a relevant part are changed to values corresponding to the adjusted values with respect to the distribution of control points of the translational components and the distribution of control points of the rotational components separated from the inference result, and the adjusted distribution of control points pertaining to the defined state is derived by adding up the changed distributions of control points. Then, the defined state information 1304 in the data of the representation model is updated based on the adjusted distribution of control points pertaining to the defined state.

Figure 11A:
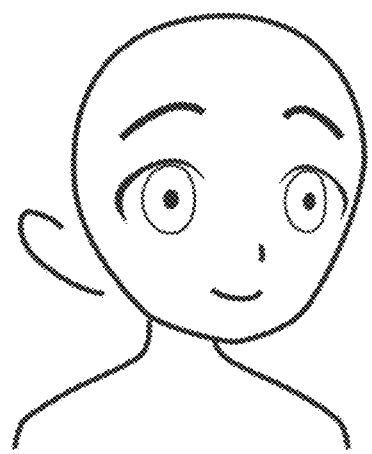
FIG. 11A is a diagram for illustrating processing for matching deformation of parts with the placement relationship set through adjustment according to the embodiment of the present invention.

Here, when the amount of translation and the amount of rotation are adjusted for each part after the inference by using a GUI such as that shown as an example in FIG. 10, it is possible that the consistency between the parts fails after the adjustment. If, for example, the amount of translation is adjusted with respect to the distribution of control points for the character's face part, the distribution of control points for the ear part is not changed, and therefore the placement relationship will become inconsistent between the ear parts and the face part as shown in FIG. 11A. For this reason, constraint conditions are defined for the placement relationship between some parts, such as the ear parts and the face part, and the content of changes in the defined state information 1304 is controlled so that the placement relationship is ensured before and after the adjustment.

Figure 11B:
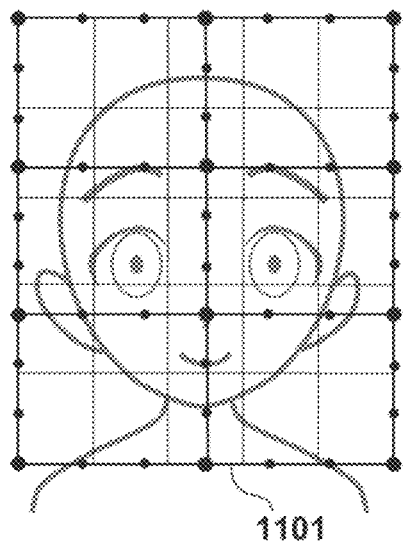
FIG. 11B is another diagram for illustrating processing for matching deformation of parts with the placement relationship set through adjustment according to the embodiment of the present invention.
Figure 11C:
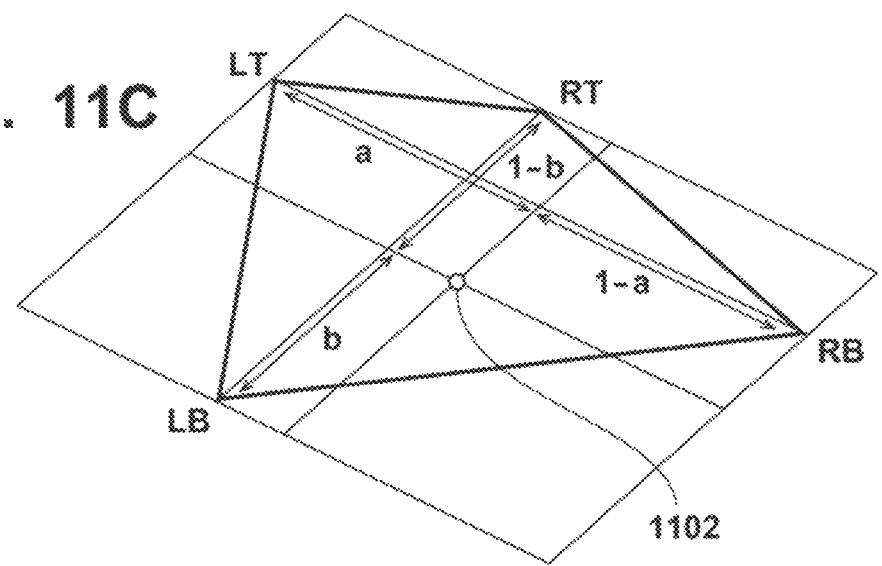
FIG. 11C is yet another diagram for illustrating processing for matching part deformation with the placement relationship set through adjustment according to the embodiment of the present invention.

More specifically, first, a grid 1101 is defined for the shape in the reference state of the curved surface to which a two-dimensional image of a relevant part (which is the face part in the following description) is applied, as shown in FIG. 11B, for example. Here, the grid 1101 may be for defining local deformation of the two-dimensional image applied in a specific mode. However, the grid 1101 in the present embodiment is a concept for specifying a partial region (which is one rectangular region subdivided by the grid 1101) of the curved surface that is represented by the distribution of control points. Information specifying which partial region a connection position between the face part and the ear parts (e.g., the positions on the curved surface of the face part that the control point at the center of the ear part overlaps) belongs to and which position within that partial region the connection position is located, in the distribution of control points pertaining to the defined state obtained by inference, is stored. The information specifying the positions in the partial region at which the connection position is placed may be constituted by the internal ratios (a, b) in two side directions corresponding to a connection position 1102 in a bounding rectangle of the partial region (a parallelogram whose opposite sides indicate diagonal directions of the partial region after the adjustment) when the corresponding partial region of the curved surface of the pre-adjustment face part is expanded to a two-dimensional plane such as that as shown in FIG. 11C.

If at least either the amount of translation or the amount of rotation is adjusted with respect to the distribution of control points pertaining to the face part after inference, the position specified by the internal ratios (a, b) in the two side directions in the bounding rectangle of the corresponding partial region of the curved surface of the face of the adjusted face part may be specified, and the distribution of control points for the ear part may also be changed so that the ear part is connected at that position.

This ensures the placement relationship between some parts and reduces the burden for adjustment on the designer.

Configuration Processing

Figure 12:
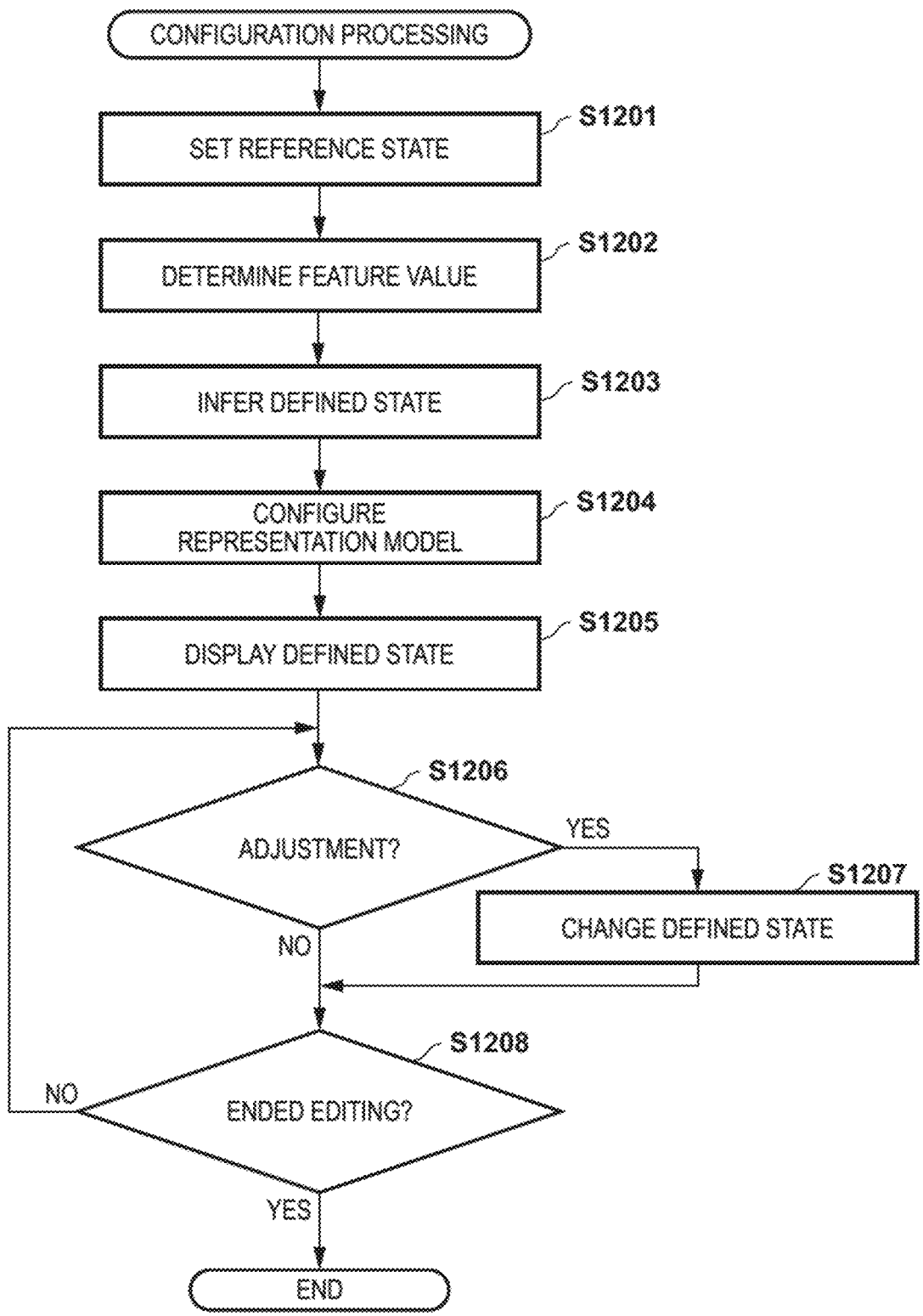
FIG. 12 is a flowchart showing an example of configuration processing executed by the configuration device 200 according to the embodiment of the present invention.

A description will be given below, with reference to the flowchart in FIG. 12, of specific configuration processing performed by the configuration device 200 of the present embodiment to configure a representation model using the inference model. Processing corresponding to the flowchart can be realized by the configuration control unit 201 reading a program associated with the editing application recorded in the configuration recording medium 202, loading the read program to the configuration memory 203 and executing it.

In the following description, the configuration processing starts when editing work related to configuration of a representation model is started with respect to illustration data in which, for example, two-dimensional images of parts of the configuration target object are separated, and a layer structure indicating the front-back relationship during rendering between the parts is defined. In the editing application corresponding to this configuration processing, in order to present information necessary for the designer to configure a representation model of the configuration target object, the display control unit 205 executes processing to display a two-dimensional image based on illustration data or a rendering representation of a configured representation model in a designated state that is generated by the rendering unit 204, as required in accordance with the frequency of display update on the display unit 220, for example. In the following description, a description of display control processing that is not characteristic to the description of the present invention is omitted.

In step S1201, the setting unit 206 sets curved surfaces and control points pertaining to the reference state for the two-dimensional image of each part of the configuration target object, under the control of the configuration control unit 201. Specifically, the setting unit 206 sets the curved surface to which the two-dimensional image is applied and the control points for controlling deformation of this curved surface, with respect to the two-dimensional image of each part included in the illustration data of the configuration target object, based on operation input accepted via the operation input unit 210. After the setting of the curved surfaces and the control points pertaining to the reference state has been completed, the setting unit 206 transmits the defined information to the configuration unit 209, and configures data of the representation model of the configuration target object that includes the transmitted information as the reference state information 1303.

In step S1202, the determination unit 207 determines the first feature values and the second feature values with respect to the representation model of the configuration target object that is configured in step S1201, under the control of the configuration control unit 201. Specifically, the determination unit 207 determines the first feature values based on the texture information 1302 and the reference state information 1303 regarding the representation model, and determines the second feature values (initial values) from average information regarding the training data associated with the inference model.

In step S1203, the inference unit 208 infers the distribution of control points pertaining to the defined state in the representation model of the configuration target object, using the inference model while using the first and second feature values as input, under the control of the configuration control unit 201.

In step S1204, the configuration unit 209 stores information regarding the distribution of control points pertaining to the defined state that is inferred in step S1203 as the defined state information 1304 in the representation model data on the configuration target object, and completes configuration of the data in the representation model, under the control of the configuration control unit 201.

In step S1205, the rendering unit 204 generates a rendering representation of the defined state based on the configured representation model data, under the control of the configuration control unit 201. The display control unit 205 then causes the display unit 220 to display the generated rendering representation of the defined state together with the GUI of the editing application related to the adjustment of each part after the inference, under the control of the configuration control unit 201.

In step S1206, the configuration control unit 201 determines whether or not at least either the amount of translation or the amount of rotation has been adjusted with respect to the distribution of control points for any part of the configuration target object. If it is determined that an adjustment has been made, the configuration control unit 201 advances the processing to step S1207, and if not, the configuration control unit 201 advances the processing to step S1208.

In step S1207, the configuration unit 209 derives a distribution of control points of the changed part based on the adjusted amount of translation and amount of rotation, and updates the defined state information 1304 in the representation model data, under the control of the configuration control unit 201. If a part for which the constraint conditions for the placement relationship has been set is adjusted, the configuration unit 209 accordingly changes the distribution of control points of the corresponding associated part, and updates the defined state information 1304.

In step S1208, the configuration control unit 201 determines whether or not the editing work for the representation model of the configuration target object has ended. If it is determined that the editing work has ended, the configuration control unit 201 stores the data in the representation model in the configuration recording medium 202 and completes the configuration processing. If not, the configuration control unit 201 returns the processing to step S1206.

Thus, the configuration processing of the present embodiment makes it possible to configure a representation model of a configuration target object that includes a defined state indicating a desired rendering representation with less workload.

Variation 1

In the above-described embodiment, inference with an inference model is executed only once when a distribution of control points for an undefined state is derived, in order to reduce the amount of computation in the configuration device 200. However, the implementation of the present invention is not limited thereto. For example, it is needless to say that inference may be performed again for a relevant part using the second feature values based on information regarding the adjusted amount of translation and amount of rotation to obtain a distribution of control points pertaining to a changed defined state. In this case, it is considered that a more natural adjustment result is obtained than in the mode of separating the distribution of control points obtained by performing inference once into translational components and non-translational components, separately adjusting these components and combining them.

Variation 2

In the description of the above embodiment and variation, the second feature values are given when an inference model is constructed (machine learning). However, the implementation of the present invention is not limited thereto.

Giving the second feature values makes it possible to learn deformation appearing in a representation model to be learned after more specifically classifying the deformation, and to obtain, as an inference result, a distribution of control points pertaining to a defined state that is more suited (more accurate) to an undefined representation model from the constructed inference model. However, this is based on the premise that a sufficient number of samples is available for the representation model to be learned. In other words, the more the number of labels, the easier the representation model to be learned can be learned for each representation. However, it is possible that the number of representation models to be learned for one combination of labels becomes smaller. It is, therefore, favorable that the absolute number of samples is large in order to avoid the problem of overlearning.

On the other hand, if the absolute number of samples is small, the probability of overlearning can increase as the number of labels increases, and as a result, it is possible that the inference model does not yield favorable inference results. Therefore, when the present invention is implemented, an inference model may be constructed by performing machine learning while giving only the first feature values as labels. In the configuration processing as well, only the first feature values may be given to obtain an inference result.

Variation 3

In the description of the above embodiment and variations, the first feature values include the size of two-dimensional images of parts. However, the implementation of the present invention is not limited thereto.

The deformation mode of parts can vary depending on the ratio between the size of the two-dimensional image of each part and the size of the curved surface to which this two-dimensional image is applied, as mentioned above. However, the present invention can be realized without including the shape and the size of two-dimensional images as the first feature values, considering that when a representation model is constructed, conventionally, a curved surface (distribution of control points) in the reference state is defined in correspondence with the shape and size of the two-dimensional image of each part, and that extremely large curved surfaces are not defined.

Variation 4

The above embodiment and variations has described an example method for constructing an inference model by machine-learning representation models configured to realize rendering representations in which the character's head turns in the yaw direction. However, the implementation of the present invention is not limited thereto. In other words, the representation models to be machine-learned may include representation models configured to realize rendering representations in which the character's head turns in a direction other than the yaw direction. For example, to realize a three-dimensional representation of the character's head, a rendering representation of motion in which the head turns in the pitch direction as well as the yaw direction may also be defined. In this case, inference models may be constructed respectively for deformation of parts in the yaw direction and deformation in the pitch direction (one inference model for one dimension). Alternatively, one inference model may be constructed for deformation of parts in a combined state (an inference model that enables inference of a distribution of control points for two-dimensional deformation). Note that, rendering representations that can be realized by representation models are not limited to such turning motion, as mentioned above. Therefore, the representation or the combination of representations for which an inference model is constructed may be changed as appropriate.

In the description of the above embodiment and variations, the distribution of control points in an inference result is constituted by translational components and rotation components in order to configure a representation model that realizes a representation model in which the character's head turns in the yaw direction. However, the implementation of the present invention is not limited thereto. That is, factors that deform parts vary depending on the target rendering representation. Therefore, deformation other than translation is not limited to rotation. In other words, in a mode in which a distribution of control points in an inference result can be separated into components for adjustment, the adjustment target may be separable into translational components and non-translational components.

In addition, in the description of the above embodiments and variations, the construction of an inference model uses, as training data, representation models that include similar rendering representations (turning representation in the yaw direction). However, more favorable inference results can be obtained by additionally using, as training data, representation models for the same use, representation models designed by the same designer, and/or representation models designed by adopting the same representation method, for example.

In the description of the above embodiments and variations, roles of the parts to be separated in representation models are defined. However, the implementation of the present invention is not limited thereto. Although defining the roles of the parts makes it possible to realize effective machine learning and favorable inference, the invention can also be similarly implemented by inferring the roles from the placement relationship between the parts, even if the roles of the parts are not defined. In other words, the present invention does not require that representation models to be machine-learned have the same part configuration, or are in a state where the number of control points to be allocated to each curved surface and the placement mode are predetermined. Similarly, the present invention does not require that the reference state of a configuration target object for which a defined state is inferred have a specific part configuration, or is in a state where the number of control points to be allocated to each curved surface and the placement mode are predetermined. In other words, the inference model need only be constructed by learning deformation of a part (or a part group) that is considered to be identical in representation models that specify a similar drawing representation. A distribution of control points that represent deformation may be learned after being transformed into a distribution with a specific fineness (resolution of representation). In contrast, when an inference result based on an inference model is used, a distribution of control points pertaining to a defined state may be defined by adjusting the inference result to the fineness of deformation that can be realized by the control points set for the reference state of the configuration target object.

OTHER EMBODIMENTS

The invention is not limited to the foregoing embodiments, and various variations/changes are possible within the spirit of the invention. The construction device and the configuration device according to the present invention can also be realized by a program that causes one or more computers to function as these devices. This program can be provided/distributed by being recorded in a computer-readable recording medium, or through a telecommunication line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An inference model construction method for constructing an inference model for inferring deformation, in a defined state, of each part of a two-dimensional image of a target object, with respect to a representation model for realizing a rendering representation corresponding to a state different from a reference state of the target object by deforming the part of the two-dimensional image corresponding to the reference state, wherein the defined state differs from the reference state, wherein the representation model is defined by defining deformation of each part of the two-dimensional image in at least one defined state, and is configured to realize a rendering representation corresponding to at least a state between the reference state and the defined state, the deformation of each part in the representation model is controlled by a mode of a distribution of control points set for the part, the inference model construction method comprises:

obtaining the distribution of the control points pertaining to the reference state and the distribution of the control points pertaining to the defined state with respect to a defined representation model, which is the representation model that has been defined;

extracting a first feature value based on the distribution of the control points pertaining to the reference state obtained in the obtaining; and estimating a second feature value based on the distribution of the control points pertaining to the reference state and the distribution of the control points pertaining to the defined state that are obtained in the obtaining, machine-learning the distribution of the control points pertaining to the defined state obtained in the obtaining while using, as a label, the first feature value extracted in the extracting and the second feature value estimated in the estimating, and constructing an inference model based on a result of the leaning performed with respect to a plurality of the defined representation models, wherein the second feature value includes information indicating an amount of deformation of translational components and an amount of deformation of non-translational components regarding deformation from the reference state to the defined state, the target object includes a head of a character, the information indicating the amount of the deformation of the translational components in the second feature value is estimated based on an amount of movement of at least one control point set for a third-type part constituting the head of the character, between the distribution of the control points pertaining to the reference state and the distribution of the control points pertaining to the defined state, and the information indicating the amount of the deformation of the non-translational components in the second feature value is estimated based on a difference between a plurality of control points set for a fourth-type part constituting the head of the character, in an amount of movement between the distribution of the control points pertaining to the reference state and the distribution of the control points pertaining to the defined state.

2. The inference model construction method according to claim 1, wherein each part in the representation model includes a two-dimensional image of the part, a curved surface to which the two-dimensional image is to be applied, and the control points specifying a shape of the curved surface, and the first feature value includes information indicating a center position and a size of the curved surface of the part in the distribution of the control points pertaining to the reference state.

3. The inference model construction method according to claim 2, wherein the first feature value further includes information indicating a size of the two-dimensional image to be applied to the curved surface pertaining to each part in the reference state.

4. The inference model construction method according to claim 1, further comprising normalizing the defined representation model, wherein the representation model normalized in the normalizing is obtained in the obtaining.

5. The inference model construction method according to claim 4, wherein the normalization includes:

normalizing a scale of the distribution of the control points pertaining to the reference state and the distribution of the control points pertaining to the defined state, based on a distance between two parts included in first-type parts constituting the head of the character; and normalizing an amount of deformation from the reference state to the defined state, based on an amount of movement of control points set for a second-type part constituting the head of the character between the scale-normalized distribution of the control points pertaining to the reference state and the scale-normalized distribution of the control points pertaining to the defined state.

6. The inference model construction method according to claim 1, wherein the fourth-type part is a part that represents unevenness in the head of the character, and the amount of the deformation of the non-translational components is estimated based on a difference in an amount of movement between a protruding portion and a recessed portion of the character.

7. The inference model construction method according to claim 1, wherein the third-type part is a part indicating a face of the character.

8. A non-transitory computer-readable recording medium in which is stored a program for causing a computer to execute the inference model construction method according to claim 1.

9. A non-transitory computer-readable recording medium in which is stored a program for causing a computer to configure a representation model for realizing a rendering representation corresponding to a state different from a reference state of a target object by deforming each part of a two-dimensional image corresponding to the reference state of the target object, by using the inference model constructed with use of the inference model construction method according to claim 1, wherein the deformation of each part in the representation model is controlled by a mode of a distribution of control points set for the part, the program causes the computer to execute:

input processing for obtaining the distribution of the control points pertaining to the reference state with respect to a configuration target object;

first determination processing for determining the first feature value based on information obtained through the input processing;

second determination processing for determining the second feature value;

inference processing for inferring, with use of the inference model, the distribution of the control points pertaining to the defined state of the configuration target object, based on the first feature value determined through the first determination processing and the second feature value determined through the second determination processing; and
output processing for configuring and outputting the representation model of the configuration target object, based on a result of the inference performed through the inference processing.

10. The recording medium according to claim 9, wherein the program further causes the computer to execute:
display control processing for causing a display unit to display a rendering representation corresponding to the defined state of the configuration target object, based on the representation model output through the output processing;
acceptance processing for accepting an adjustment of at least one of an amount of deformation of translational components or an amount of deformation of non-translational components, with respect to deformation in the rendering representation corresponding to the defined state from the reference state; and
change processing for, if the adjustment is accepted through the acceptance processing, changing the distribution of the control points pertaining to the defined state of the output representation model, based on the adjusted amount of the deformation of the translational components and the non-translational components,
wherein if the adjustment is accepted through the acceptance processing, the rendering representation corresponding to the defined state of the configuration target object is displayed in the display unit, based on the representation model after the changing through the change processing.

11. The recording medium according to claim 10, wherein the program further causes the computer to execute
separation processing for separating the distribution of the control points pertaining to the defined state inferred through the inference processing into a distribution of the translational components and a distribution of the non-translational components,
wherein in the change processing, the distribution of the control points pertaining to the defined state of the output representation model is changed to a distribution of the control points obtained by combining the distribution of the translational components and the distribution of the non-translational components that have been changed in accordance with the adjusted amount of the deformation of the translational components and the non-translational components.

12. The recording medium according to claim 11, wherein a constraint condition regarding a placement relationship is defined for at least some parts of the configuration target object, and
in the change processing, placement positions of the at least some parts are changed so as to ensure the placement relationship of the at least some parts before and after the adjustment.

13. A configuration device for configuring a representation model for realizing a rendering representation corresponding to a state different from a reference state of a target object by deforming each part of a two-dimensional image corresponding to the reference state of the target object, by using the inference model constructed with use of the inference model construction method according to claim 1, wherein
the deformation of each part in the representation model is controlled by a mode of a distribution of control points set for the part,
the configuration device comprises:
at least one processor; and
a memory configured to store instructions that, when executed by the at least one processor, cause the at least one processor to function as:
an input unit configured to obtain the distribution of the control points pertaining to the reference state with respect to a configuration target object;
a first determination unit configured to determine the first feature value based on information obtained by the input unit;
a second determination unit configured to determine the second feature value;
an inference unit configured to infer, with use of the inference model, the distribution of the control points pertaining to the defined state of the configuration target object, based on the first feature value determined by the first determination unit and the second feature value determined by the second determination unit; and
an output unit configured to configure and output the representation model of the configuration target object, based on a result of the inference performed by the inference unit.

14. A configuration method for configuring a representation model for realizing a rendering representation corresponding to a state different from a reference state of a target object by deforming each part of a two-dimensional image corresponding to the reference state of the target object, by using the inference model constructed with use of the inference model construction method according to claim 1, wherein
the deformation of each part in the representation model is controlled by a mode of a distribution of control points set for the part,
the configuration method comprises:
obtaining the distribution of the control points pertaining to the reference state with respect to a configuration target object;
determining the first feature value based on information obtained in the obtaining;
determining the second feature value;
inferring, with use of the inference model, the distribution of the control points pertaining to the defined state of the configuration target object, based on the determined first feature value and the determined second feature value; and
configuring and outputting the representation model of the configuration target object, based on a result of the inference performed in the inferring.

15. An inference model construction device for constructing an inference model for inferring deformation, in a defined state, of each part of a two-dimensional image of a target object, with respect to a representation model for realizing a rendering representation corresponding to a state different from a reference state of the target object by deforming the part of the two-dimensional image corresponding to the reference state, wherein the defined state differs from the reference state, wherein
the representation model is defined by defining deformation of each part of the two-dimensional image in at least one defined state, and is configured to realize a rendering representation corresponding to at least a state between the reference state and the defined state,
the deformation of each part in the representation model is controlled by a mode of a distribution of control points set for the part, the inference model construction device comprises:

at least one processor; and a memory configured to store instructions that, when executed by the at least one processor, cause the at least one processor to function as:

an obtaining unit configured to obtain the distribution of the control points pertaining to the reference state and the distribution of the control points pertaining to the defined state with respect to a defined representation model, which is the representation model that has been defined;

an extraction unit configured to extract a first feature value based on the distribution of the control points pertaining to the reference state obtained by the obtaining unit;

an estimation unit configured to estimate a second feature value based on the distribution of the control points pertaining to the reference state and the distribution of the control points pertaining to the defined state that are obtained by the obtaining unit; and a learning unit configured to machine-learn the distribution of the control points pertaining to the defined state obtained by the obtaining unit while using, as a label, the first feature value extracted by the extraction unit and the second feature value estimated by the estimation unit, and constructing an inference model based on a result of the leaning performed with respect to a plurality of the defined representation models, wherein the second feature value includes information indicating an amount of deformation of translational components and an amount of deformation of non-translational components regarding deformation from the reference state to the defined state, the target object includes a head of a character, the information indicating the amount of the deformation of the translational components in the second feature value is estimated based on an amount of movement of at least one control point set for a third-type part constituting the head of the character, between the distribution of the control points pertaining to the reference state and the distribution of the control points pertaining to the defined state, and the information indicating the amount of the deformation of the non-translational components in the second feature value is estimated based on a difference between a plurality of control points set for a fourth-type part constituting the head of the character, in an amount of movement between the distribution of the control points pertaining to the reference state and the distribution of the control points pertaining to the defined state.

* * * * *